(12) United States Patent
Hagihara et al.

(10) Patent No.: US 12,269,296 B2
(45) Date of Patent: Apr. 8, 2025

(54) TIRE

(71) Applicant: SUMITOMO RUBBER INDUSTRIES, LTD., Hyogo (JP)

(72) Inventors: Takashi Hagihara, Kobe (JP); Ryota Ikeda, Kobe (JP); Takuya Fujimoto, Kobe (JP); Daichi Takatsuki, Kobe (JP); Masahiro Tatsuta, Kobe (JP); Kengo Fukuda, Kobe (JP)

(73) Assignee: SUMITOMO RUBBER INDUSTRIES, LTD., Hyogo (JP)

( * ) Notice: Subject to any disclaimer, the term of this patent is extended or adjusted under 35 U.S.C. 154(b) by 522 days.

(21) Appl. No.: 17/560,558

(22) Filed: Dec. 23, 2021

(65) Prior Publication Data

US 2022/0203773 A1 Jun. 30, 2022

(30) Foreign Application Priority Data

Dec. 28, 2020 (JP) .................................. 2020-218185
Oct. 26, 2021 (JP) .................................. 2021-174925

(51) Int. Cl.
*B60C 11/04* (2006.01)
*B60C 11/03* (2006.01)
*B60C 11/12* (2006.01)

(52) U.S. Cl.
CPC ...... *B60C 11/1218* (2013.01); *B60C 11/0304* (2013.01); *B60C 11/033* (2013.01);
(Continued)

(58) Field of Classification Search
CPC ............. B60C 11/1281; B60C 11/0304; B60C 11/1236; B60C 11/033; B60C 11/1218;
(Continued)

(56) References Cited

U.S. PATENT DOCUMENTS 2,268,344 A * 12/1941 Shesterkin .......... B60C 11/0309
152/DIG. 4
2,272,879 A * 2/1942 Hargraves ........... B60C 11/1263
D12/598
6,443,199 B1 * 9/2002 Scarpitti ............... B60C 19/001
152/209.1

(Continued)

FOREIGN PATENT DOCUMENTS

DE 102012108847 A1 * 3/2014 ......... B60C 11/0309
JP 62-059108 A * 3/1987
(Continued)

OTHER PUBLICATIONS

Machine translation for Japan 2011-225105 (Year: 2024).*
(Continued)

*Primary Examiner* — Steven D Maki
(74) *Attorney, Agent, or Firm* — Greenblum & Bernstein, P.L.C.

(57) ABSTRACT

A tire for which a mounting direction to a vehicle is specified, has a tread portion axially divided into five land portions each provided with sipes. The five land portions are a first shoulder land portion, a first middle land portion, a crown land portion, a second middle land portion, and a second shoulder land portion having ground contacting surface widths $W1s$, $W1m$, $Wc$, $W2m$ and $W2s$, respectively, which satisfy the following condition: $W1s > W1m > Wc > W2m => W2s$ under a 50% load state of the tire.

14 Claims, 18 Drawing Sheets

(52) U.S. Cl.
CPC ...... *B60C 11/1236* (2013.01); *B60C 11/1263* (2013.01); *B60C 11/1281* (2013.01); *B60C 2011/0353* (2013.01); *B60C 2011/1209* (2013.01); *B60C 2011/1213* (2013.01); *B60C 2011/1227* (2013.01); *B60C 2011/1254* (2013.01); *B60C 2011/129* (2013.01)

(58) Field of Classification Search
CPC ..... B60C 2011/0353; B60C 2011/1213; B60C 2011/1254; B60C 2011/1227; B60C 2011/1209; B60C 2011/129
See application file for complete search history.

(56) References Cited

U.S. PATENT DOCUMENTS

2007/0199634 A1* 8/2007 Sakamaki ........... B60C 11/1218 152/902
2022/0203774 A1* 6/2022 Kuriyama ........... B60C 11/0304

FOREIGN PATENT DOCUMENTS

| JP | 05-286311 | A | * | 11/1993 | |
|---|---|---|---|---|---|
| JP | 06-239110 | A | * | 8/1994 | |
| JP | 2001-001722 | A | * | 1/2001 | ......... B60C 11/1218 |
| JP | 2007-223493 | A | * | 9/2007 | ......... B60C 11/1281 |
| JP | 2010-132181 | A | | 6/2010 | |
| JP | 2011-225105 | A | * | 11/2011 | |

OTHER PUBLICATIONS

Machine translation for Japan 06-239110 (Year: 2024).*
Machine translation for Japan 05-286311 (Year: 2024).*
Machine translation for Japan 62-059108 (Year: 2024).*
Machine translation for German 102012108847 (Year: 2024).*
Machine translation for Japan 2001-001722 (Year: 2024).*
Machine translation for Japan 2007-223493 (Year: 2024).*

* cited by examiner

TIRE

BACKGROUND OF THE INVENTION

Field of the Invention

The present disclosure relates a tire.

Background Art

The following Patent Document 1 discloses a pneumatic tire of which tread portion is axially divided into five land portions: a crown land portion, a pair of middle land portions and a pair of shoulder land portions.

The shoulder land portion is provided with inner grooves, outer grooves and intermediate slots therebetween extending in the tire axial direction. The inner grooves extend outward in the tire axial direction from a shoulder circumferential groove and are terminated without reaching a tread edge. The outer grooves extend inward in the tire axial direction from the tread edge and are terminated without reaching the shoulder circumferential groove and without intersecting with the inner grooves. In the intermediate slot, its inner end in the tire axial direction is terminated without reaching the shoulder circumferential groove, and its outer end in the tire axial direction is terminated without reaching the tread edge.

As a result, the shoulder land portions of the pneumatic tire are continuous in the tire circumferential direction. Thereby, the pneumatic tire is expected to maintain drainage performance, suppress heel-and-toe wear in the shoulder land portions, and improve noise performance due to the above-mentioned features.

PRIOR ART DOCUMENT

Patent Document

Patent Document 1: Japanese Patent Application Publication No. 2010-132181

SUMMARY OF THE INVENTION

Problems to be Solved by the Invention

In recent years, tires are required to have further improved ride comfort and noise performance. The inventors have found, as a result of study of a tire whose tread portion comprises five land portions, that the above-mentioned performances can be improved by specifically defining the widths of the land portions, and have accomplished the present disclosure.

It is therefore, an primary object of the present disclosure to provide a tire having improved ride comfort and noise performance.

Means for Solving the Problems

According to the present disclosure, a tire for which a mounting direction to a vehicle is specified, comprises:

a tread portion having a first tread edge and a second tread edge to be positioned outboard and inboard, respectively, of the vehicle, wherein the tread portion is provided with four circumferential grooves extending continuously in the tire circumferential direction so as to axially divide the tread portion into five land portions, the five land portions are a first shoulder land portion including the first tread edge, a second shoulder land portion including the second tread edge, a first middle land portion adjacent to the first shoulder land portion, a second middle land portion adjacent to the second shoulder land portion, and a crown land portion between the first middle land portion and the second middle land potion, each of the five land portions is provided sipes, under a 50% load state of the tire defined such that the tire mounted on a normal rim and inflated to a normal pressure is contacted with a flat horizontal plane at a camber angle of 0 degree and loaded with 50% of a normal tire load, axial widths $W1s$, $W1m$, $Wc$, $W2m$ and $W2s$ of ground contacting surfaces of the first shoulder land portion, the first middle land portion, the crown land portion, the second middle land portion, and the second shoulder land portion, respectively, satisfy the following condition: $W1s > W1m > Wc > W2m => W2s$.

Effects of the Invention

By adopting the above configuration, the tire of the present disclosure can be improved in ride comfort and noise performance.

DETAILED DESCRIPTION OF THE INVENTION

Hereinafter, embodiments of the present disclosure will be described in detail in conjunction with accompanying drawings.

Figure 1:
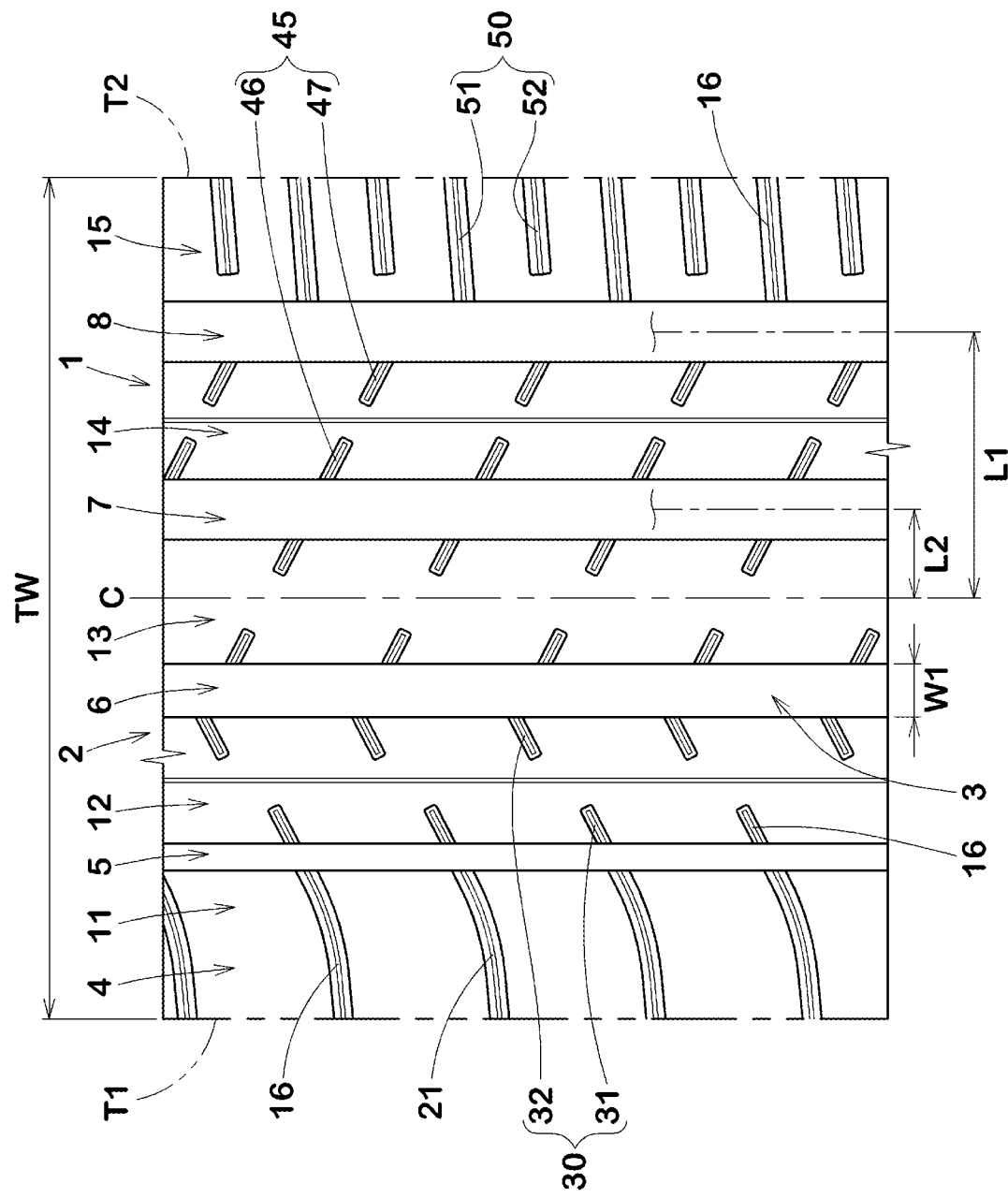
FIG. 1 is a developed partial view of a tread portion of a tire as an embodiment of the present disclosure.

FIG. 1 is a developed partial view of a tread portion 2 of a tire 1 as an embodiment of the present disclosure.

The tire 1 in the present embodiment is a pneumatic tire for a passenger car to which the present disclosure is suitably applied.

The application of the present disclosure is however, not limited to such passenger car tires, and the present disclosure may be applied to pneumatic tires for heavy duty vehicle as well as non-pneumatic tires so called airless tires.

As shown in FIG. 1, the tire 1 according to the present disclosure has a designated orientation for mounting on a vehicle, and as a result, its tread portion 2 has a first tread edge T1 and a second tread edge T2 intended to be positioned outboard and inboard, respectively, of a vehicle when the tire 1 is mounted on the vehicle. The tread portion 2 has a tread surface or ground contacting surface between the first tread edge T1 and second tread edge T2. The direction of mounting on a vehicle is indicated by characters and/or symbols, for example, on the sidewall portions (not shown) of the tire.

The first tread edge T1 and the second tread edge T2 correspond to the outermost ground contacting positions in the tire axial direction when the tire 1 under its normal state is contacted with a flat horizontal plane at a camber angle of 0 degree at a vertical tire load of 50% of a normal load.

The "normal state" is a state of a tire which is mounted on a normal rim, inflated to a normal pressure, and loaded with no tire load in the case of pneumatic tires for which various standards are defined.

In the case of tires for which no standards are defined or non-pneumatic tires, the normal state means a standard usage state according to the purpose of use of the tire which is not mounted on a vehicle and loaded with no tire load.

In the present specification, unless otherwise noted, dimensions, positions and the like relating to the tire refer to those under the normal state. It should be noted that each configuration described herein may include the usual errors involved in the rubber molded articles.

The "normal rim" is a wheel rim specified for the tire by a standard included in a standardization system on which the tire is based, for example, the "normal wheel rim" in JATMA, "Design Rim" in TRA, and "Measuring Rim" in ETRTO.

The "normal pressure" is air pressure specified for the tire by a standard included in a standardization system on which the tire is based, for example, the "maximum air pressure" in JATMA, maximum value listed in the "TIRE LOAD LIMITS AT VARIOUS COLD INFLATION PRESSURES" table in TRA, and "INFLATION PRESSURE" in ETRTO.

The "normal load" is a load specified for the tire by a standard included in a standardization system on which the tire is based, for example, the "maximum load capacity" in JATMA, maximum value listed in "TIRE LOAD LIMITS AT VARIOUS COLD INFLATION PRESSURES" table in TRA, and "LOAD CAPACITY" in ETRTO.

Further, in the case of a tire for which no standards are defined or a non- pneumatic tire, the "normal load" refers to the load acting on the tire in its standard mounted state.

The "standard mounted state" refers to a state in which the tire is mounted on a standard vehicle according to the purpose of use of the tire, and the vehicle is stationary on a flat road surface in a state where the vehicle is ready to run.

The tread portion 2 is provided, between the first tread edge T1 and the second tread edge T2, with a plurality of circumferential grooves 3 continuously extending in the tire circumferential direction so as to axially divide the tread portion 2 into a plurality of land portions 4.

In the present embodiment, the tread portion 2 is provided with four circumferential grooves 3 and divided into five land portions 4.

The circumferential grooves 3 include a first shoulder circumferential groove 5, a first crown circumferential groove 6, a second crown circumferential groove 7, and a second shoulder circumferential groove 8.

The first shoulder circumferential groove 5 is disposed between the first tread edge T1 and the tire equator C.

The second shoulder circumferential groove 8 is disposed between the second tread edge T2 and the tire equator C.

The first crown circumferential groove 6 is disposed between the first shoulder circumferential groove 5 and the tire equator C.

The second crown circumferential groove 7 is disposed between the second shoulder circumferential groove 8 and the tire equator C.

The distance L1 in the tire axial direction from the tire equator C to the widthwise center line of the first shoulder circumferential groove 5, and the distance L1 in the tire axial direction from the tire equator C to the widthwise center line of the second shoulder circumferential groove 8 are preferably in a range from 25% to 35% of the tread width TW.

The distance L2 in the tire axial direction from the tire equator C to the widthwise center line of the first crown circumferential groove 6, and the distance L2 in the tire axial direction from the tire equator C to the widthwise center line of the second crown circumferential groove 7 are preferably in a range from 5% to 15% of the tread width TW.

The tread width TW is the distance in the tire axial direction from the first tread edge T1 to the second tread edge T2 measured under the normal state.

In the present embodiment, each of the circumferential grooves 3 extends linearly in parallel with the tire circumferential direction.

However, each or one or more circumferential grooves 3 may be extended in a wavy shape, for example.

The groove width W1 of each of the circumferential grooves 3 is preferably set in a range from 2.0% to 10.0%, more preferably 2.0% to 8.0% of the tread width TW, In the present embodiment, among the four circumferential grooves 3, the first shoulder circumferential groove 5 has the smallest groove width. The first crown circumferential groove 6 has the second smallest groove width among the four circumferential grooves 3.

As a result, the rigidity is relatively increased in a first tread edge T1 side area of the tread portion 2, and braking performance, noise performance and steering stability are improved in a well-balanced manner.

The present disclosure is however, not limited to such configuration.

The depth of each of the circumferential grooves 3 is preferably set in a range from 5 to 10 mm when the tire 1 is a pneumatic tire for a passenger car.

Specifically, it is preferred, in this example, that the groove width of the first shoulder circumferential groove 5 is 2.9% to 4.0% of the tread width TW;
the groove width of the first crown circumferential groove 6 is 5.6% to 8.7%, preferably 5.6% to 7.4% of the tread width TW; and
the groove width of each of the second shoulder circumferential groove 8 and the second crown circumferential groove 7 is 6.4% to 9.6%, preferably 7.7% to 9.6% of the tread width TW.

According to the present disclosure, the land portions 4 include a first shoulder land portion 11, a first middle land portion 12, a crown land portion 13, a second middle land portion 14, and a second shoulder land portion 15.

The first shoulder land portion 11 is defined as extending axially inwardly from the first tread edge T1.

The second shoulder land portion 15 is defined as extending axially inwardly from the second tread edge T2.

The first middle land portion 12 is defined between the first shoulder circumferential groove 5 and the first crown circumferential groove 6, and positioned adjacently to the first shoulder land portion 11, on the second tread edge T2 side thereof.

The second middle land portion 14 is defined between the second crown circumferential groove 7 and the second shoulder circumferential groove 8, and is positioned adjacently to the second shoulder land portion 15, on the first tread edge T1 side thereof.

The crown land portion 13 is defined between the first crown circumferential groove 6 and the second crown circumferential groove 7, and positioned between the first middle land portion 12 and the second middle land portion 14.

In the present embodiment, the crown land portion 13 is disposed on the tire equator C.

Each of the land portions 4 is provided with sipes 16.

The term "sipe" means a narrow groove having a width not more than 1.5 mm inclusive of a cut having no substantial width when measured between two sipe walls in the main portion of the sipe 16.

The above-said width of the sipe 16 is preferably 0.2 to 1.2 mm, more preferably 0.5 to 1.0 mm.

The sipe 16 may be a sipe comprising a widening portion which opens with a opening width larger than the above-said width in the main portion, or a sipe comprising a flask-shaped bottom portion having a larger width than the above-said width in the main portion.

Figure 2:
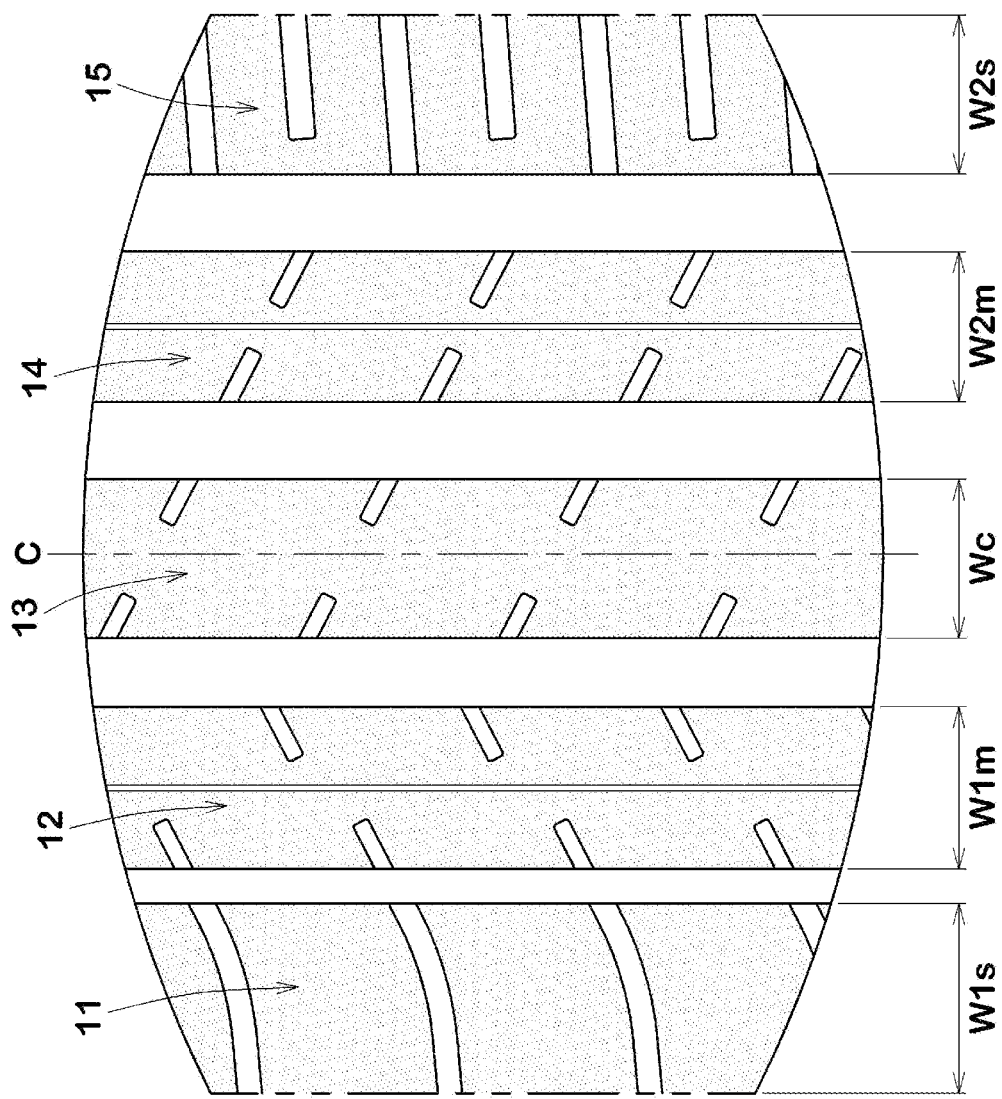
FIG. 2 schematically shows the ground contacting patch of the tire.

FIG. 2 schematically shows the ground contact patch of the tread portion 2 when the tire 1 mounted on the normal rim and inflated to the normal tire pressure is contacted with a flat horizontal plane at a camber angle of 0 degree at a vertical tire load of 50% of the normal load. Hereinafter, such condition of the tire is referred as the 50% load condition.

In the ground contact patch under the 50% load condition, as shown, the first middle land portion 12, the crown land portion 13, the second middle land portion 14, and the second shoulder land portion 15 respectively have ground contacting widths $W1s$, $W1m$, $Wc$, $W2m$, and $W2s$ in the tire axial direction, and in the present disclosure, these widths satisfy the following condition (1): $W1s>W1m>Wc>W2m>=W2s$ in order to improve the ride comfort and noise performance.

With the above configuration, in the tire 1 according to the present disclosure, the land portion rigidity is relaxed in a region of the tread portion 2 inboard of the vehicle, and the ride comfort is improved. At the same time, the impact noise from the land portions when contacting with the ground is reduced, thereby, noise performance can be improved.

Thus, the tire according to the present disclosure can be improved in ride comfort and noise performance.

Further, in the tire 1 having the above configuration, the land portion near the first tread edge T1 has a higher rigidity. Therefore, even when the center of the ground contacting surface shift to the first tread edge T1 side by steering, the steering response is maintained stable and, according to the increase in the steering angle, the cornering force is linearly generated. Thus, the tire 1 according to the present disclosure can exhibit excellent steering stability.

Hereinafter, more detailed configurations of the present embodiment will be described.

In addition, each configuration described below shows a specific example of the present embodiment. Therefore, it goes without saying that the present disclosure can exert the above-mentioned effects even if it does not have the configuration described below. Further, even if any one of the configurations described below is independently applied to the tire of the present disclosure having the above-described features, improvement in performance according to each configuration can be expected. Further, when some of the configurations described below are applied in combination, synergistic improvement in performance owing to the respective configurations will be expected.

The ground contacting width $W1s$ of the first shoulder land portion 11 is preferably set in a range from 115% to 125% of the ground contacting width $Wc$ of the crown land portion 13 under the 50% load condition.

As a result, the rigidity of the first shoulder land portion 11 is optimized, and thereby the noise performance can be improved in cooperation with the above-mentioned effects.

From the same viewpoint, the ground contacting width $W1m$ of the first middle land portion 12 is preferably set in a range from 101% to 107% of the ground contacting width $Wc$ of the crown land portion 13 under the 50% load condition.

The ground contacting width $W2m$ of the second middle land portion 14 is preferably set in a range from 90% to 99% of the ground contacting width $Wc$ of the crown land portion 13 under the 50% load condition.

Thereby, the noise performance during straight running is improved. In addition, the vibration of the tire during straight running becomes less likely to be transmitted to the vehicle body, and the riding comfort is also improved.

From the same viewpoint, the ground contacting width $W2s$ of the second shoulder land portion 15 is preferably set in a range from 90% to 99% of the ground contacting width $Wc$ of the crown land portion 13 under the 50% load condition.

In the present embodiment, more preferably, the ground contacting width $W2m$ of the second middle land portion 14 is set to be the same as the ground contacting width $W2s$ of the second shoulder land portion 15 under 50% load state. As a result, the progress of wear becomes uniform between the second middle land portion 14 and the second shoulder land portion 15, and the uneven wear resistance performance is improved.

Figure 3:
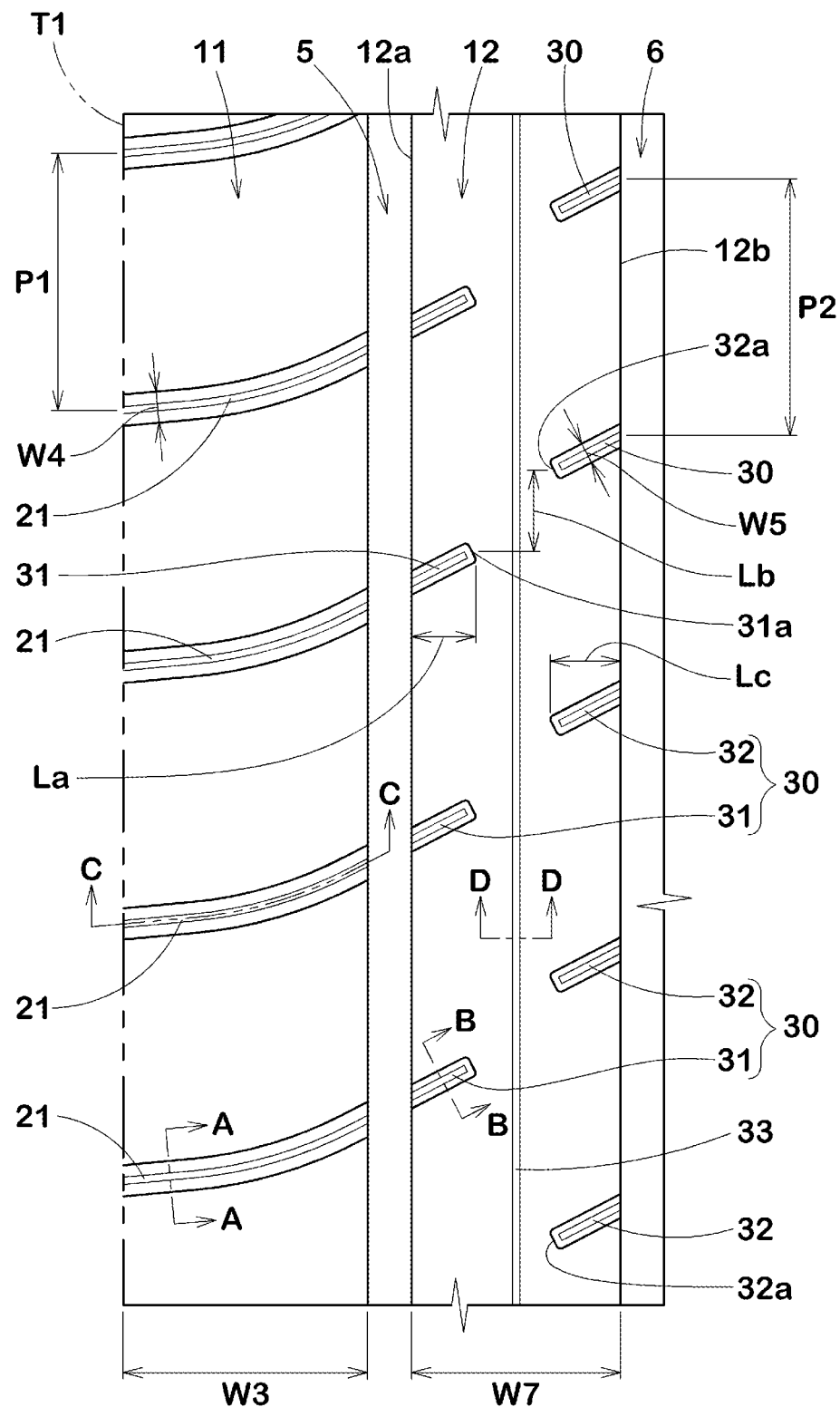
FIG. 3 is a partial view of the tread portion showing the first shoulder land portion and the first middle land portion show in FIG. 1.

FIG. 3 shows the first shoulder land portion 11 and the first middle land portion 12.

As shown, the first shoulder land portion 11 is provided with only sipes so as not to decrease the rigidity of the first shoulder land portion 11.

In the present embodiment, there are provided, a plurality of first shoulder sipes 21 extending in the tire axial direction.

One pitch length P1 in the tire circumferential direction of the first shoulder sipes 21 are, for example, set in a range from 100% to 130% of the axial width W3 of the ground contacting surface of the first shoulder land portion 11.

Here, one pitch length between two sipes is a distance in parallel to the tire circumferential direction measured from the center position in the width direction in the cross section of one of the two sipes to the center position in the width direction in the cross section of the other of the two sipes. When the distance changes in the tire axis direction, one pitch length is defined by the mean distance.

It is preferable that the first shoulder sipes 21 are connected to the first shoulder circumferential groove 5.

In the present embodiment, the first shoulder sipes 21 extend crosses the entire axial width of the first shoulder land portion 11 from the first shoulder circumferential groove 5 to the first tread edge T1.

The first shoulder sipes 21 are however, not limited to such configuration. For example, the first shoulder sipes 21 may have closed ends terminated within the first shoulder land portion 11.

The first shoulder sipes 21 are inclined with respect to the tire axial direction to a first direction (inclined upward to the right in each drawing). The angle of each of the first shoulder sipes 21 is, for example, in a range from 5 to 35 degrees with respect to the tire axial direction.

Preferably, the first shoulder sipe 21 comprises a portion in which the angle with respect to the tire axial direction is increased toward the second tread edge T2. Such first shoulder sipe 21 can exert a frictional force in the tire axial direction as well.

The first shoulder sipe 21 in this example has an opening width W4 in a range from 4.0 to 8.0 mm at the tread surface. Such first shoulder sipe 21 can improve the uneven wear resistance.

Figure 4:
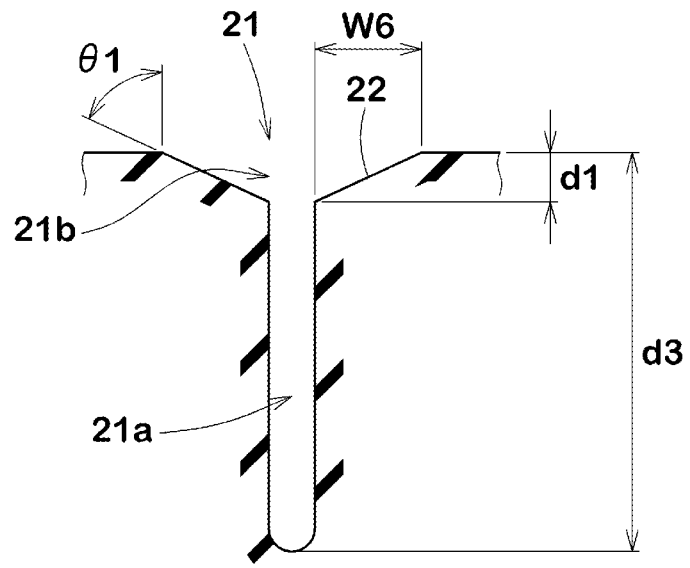
FIG. 4 is a cross-sectional view taken along line A-A of FIG. 3.

FIG. 4 is a cross-sectional view of the first shoulder sipe 21 taken along line A-A of FIG. 3.

As shown, in the depth direction, the first shoulder sipe 21 comprises a main portion 21a extending in the tire radial direction, and a widening portion 21b having a larger width than the main portion 21a and opened at the ground contacting surface of the land portion. The width in the main portion 21a in the present embodiment is in a range from 0.5 to 1.5 mm.

The widening portion 21b of the first shoulder sipe 21 has an inclined surface 22 extending from the main portion 21a to the tread surface. The inclined surface 22 of the present embodiment is planar and is inclined at an angle θ1 of 50 to 70 degrees with respect to the tire radial direction.

When a large ground contact pressure acts on the land portion, the entire inclined surface 22 contacts with the ground, and thereby, the substantial ground contact area of the tread portion is increased. As a result, steering stability and ride comfort are improved.

The depth d1 of the widening portion 21b of the first shoulder sipe 21 is in a range from 10% to 30% of the maximum depth d3 of the first shoulder sipe 21, and preferably in a range from 0.5 to 2.0 mm in the present embodiment.

The maximum depth d3 of the first shoulder sipe 21 is, for example, set in a range from 70% to 100% of the depth of the circumferential groove 3.

The width W6 of the inclined surface 22 of the widening portion 21b of the first shoulder sipe 21 measured in the cross section of the sipe in parallel with the tread surface as shown in FIG. 4 is, for example, 2.0 to 4.0 mm.

Figure 5:
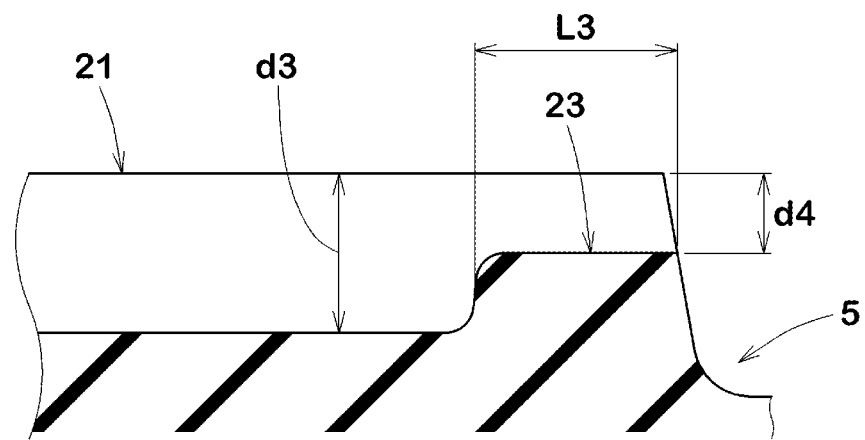
FIG. 5 is a cross-sectional view taken along line C-C of FIG. 3.

FIG. 5 is a cross-sectional view of the first shoulder sipe 21 taken along line C-C of FIG. 3, namely, the widthwise center line.

As shown, the first shoulder sipe 21 comprises a shallow portion 23 formed by a locally raised bottom.

In the present embodiment, the shallow portion 23 is provided in an end portion connected to the first shoulder circumferential groove 5.

The minimum depth d4 in the shallow portion 23 is in a range from 40% to 60% of the maximum depth d3 of the first shoulder sipe 21.

The length L3 of the shallow portion 23 in the tire axial direction is in a range from 10% to 30% of the axial width W3 (shown in FIG. 3) of the first shoulder land portion 11. The length L3 of the shallow portion 23 is measured at the center position in the height direction of the shallow portion 23.

The first shoulder sipe 21 having such shallow portion 23 maintains the rigidity of the first shoulder land portion 11 and improves the steering stability.

As shown in FIG. 3, the first middle land portion 12 has a first axial edge 12a on the first tread edge T1 side, a second axial edge 12b on the second tread edge T2 side, and a ground contacting surface between the first axial edge 12a and the second axial edge 12b.

The first middle land portion 12 is provided with only sipes so as not to decrease the rigidity of the first middle land portion 12.

In the present embodiment, the first middle land portion 12 is provided with a plurality of first middle sipes 30 extending in the tire axial direction.

In the present embodiment, the opening width W5 at the tread of the first middle sipe 30 is smaller than the opening width W4 at the tread of the first shoulder sipe 21.

Specifically, the opening width W5 of the first middle sipe 30 is, for example, set in a range from 2.0 to 6.0 mm.

Further, the opening width W5 of the first middle sipe 30 is set in a range from 50% to 90% of the opening width W4 of the first shoulder sipe 21.

Such first middle sipes 30 can improve the uneven wear resistance performance.

Figure 6:
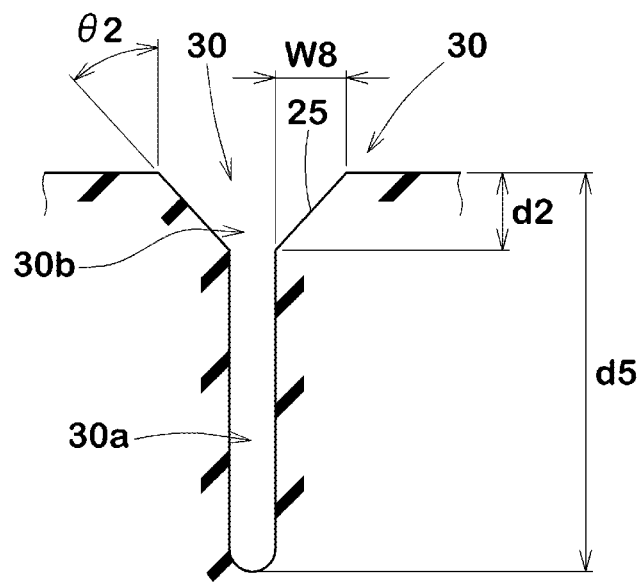
FIG. 6 is a cross-sectional view taken along line B-B of FIG. 3.

FIG. 6 is a sectional view of the first middle sipe 30 taken along line B-B of FIG. 3.

As shown, in the depth direction, the first middle sipe 30 comprises a main portion 30a extending in the tire radial direction, and a widening portion 30b opened at the ground contacting surface of the land portion and having a width larger than the main portion 30a. In the present embodiment, the width in the main portion 30a is, for example, in a range from 0.5 to 1.5 mm.

The widening portion 30b of the first middle sipe 30 has an inclined surface 25 extending from the main portion 30a to the ground contacting surface. In the present embodiment, the inclined surface 25 is planar and inclined at an angle θ2 in a range from 30 to 60 degrees with respect to the tire radial direction.

The depth d2 of the widening portion 30b of the first middle sipe 30 is in a range from 15% to 30% of the maximum depth d5 of the first middle sipe 30. For example, the depth d2 of the widening portion 30b of the first middle sipe 30 is in a range from 1.0 to 3.0 mm.

Preferably, the depth d2 of the widening portion 30b of the first middle sipe 30 is larger than the depth d1 (shown in FIG. 4) of the widening portion 21b of the first shoulder sipe 21.

The depth d1 of the widening portion 21b of the first shoulder sipe 21 is in a range from 50% to 90%, preferably 60% to 80% of the depth d2 of the widening portion 30b of the first middle sipe 30.

The width W8 of the inclined surface 25 of the widening portion 30b of the first middle sipe 30 measured in the cross section of the sipe in parallel with the tread surface as shown in FIG. 6 is, for example, in a range from 1.0 to 3.0 mm.

As shown in FIG. 3, the first middle sipe 30 includes an outer first middle sipe 31 extending from the first axial edge 12a and having a closed end 31a within the first middle land portion 12, and an inner first middle sipe 32 extending from the second axial edge 12b and having a closed end 32a within the first middle land portion 12.

The first middle sipe 30 extends linearly in a partial plan view of the tread portion.

Further, the first middle sipes 30 are inclined with respect to the tire axial direction to the above-mentioned first direction as shown in FIG. 3.

More specifically, each of the outer first middle sipes 31 and the inner first middle sipes 32 extends linearly and is inclined with respect to the tire axial direction to the first direction in a partial plan view of the tread portion.

The angle of the outer first middle sipe 31 with respect to the tire axial direction and the angle of the inner first middle sipe 32 with respect to the tire axial direction are preferably not less than 20 degrees, more preferably not less than 25 degrees, but preferably not more than 45 degrees, more preferably not more than 40 degrees.

Such outer first middle sipes 31 and inner first middle sipes 32 can exert frictional forces in the tire axial direction and circumferential direction in a well-balanced manner.

The angle difference between the outer first middle sipe 31 and the inner first middle sipe 32 is preferably not more than 10 degrees, more preferably not more than 5 degrees, and in the present embodiment, these sipes 31 and 32 are arranged in parallel with each other.

Such outer first middle sipes 31 and inner first middle sipes 32 can suppress uneven wear of the first middle land portion 12.

Each of the outer first middle sipes 31 and the inner first middle sipes 32 is terminated within the first middle land portion 12 so that the terminal end is positioned not beyond a center in the tire axial direction of the first middle land portion 12.

The axial length La of the outer first middle sipe 31 is preferably not less than 20%, more preferably not less than 25%, but preferably not more than 45%, more preferably not more than 40% of the axial width W7 of the first middle land portion 12.

The axial length Lc of the inner first middle sipe 32 is preferably not less than 20%, more preferably not less than 25%, but preferably not more than 45%, more preferably not more than 40% of the axial width W7 of the first middle land portion 12.

Such outer first middle sipes 31 and inner first middle sipes 32 can improve ride comfort and noise performance while maintaining steering stability.

It is preferable that the outer first middle sipes 31 are arranged at the substantially same pitches as the inner first middle sipes 32, but shifted in the tire circumferential direction from the inner first middle sipes 32, In the present embodiment, in a partial plan view of the tread portion, the extents in the tire circumferential direction of the outer first middle sipes 31 do not overlap with those of the inner first middle sipes 32 in the tire circumferential direction.

Further, the terminal ends 31a of the outer first middle sipes 31 are shifted in the tire circumferential direction from the terminal ends 32a of the inner first middle sipes 32.

The distances Lb in the tire circumferential direction between the terminal ends 31a of the outer first middle sipes 31 and the respective adjacent terminal ends 32a of the inner first middle sipes 32 are preferably not more than 50%, more preferably not more than 40%, but preferably not less than 25% of one pitch length P2 in the tire circumferential direction of the first middle sipes 30.

Preferably, the distance Lb is set in a range from La×2−1 (mm) to La×2+1 (mm), namely, Lb=2 La+/−1 (mm).

As a result, the pitch sound from the sipes is likely to become white noise, and the noise performance is improved.

One pitch length P2 of the first middle sipes 30 is, for example, set in a range from 80% to 120%, preferably 100% of one pitch length P1 of the first shoulder sipes 21.

In the present embodiment, the outer first middle sipes 31 are connected to the first shoulder circumferential groove 5. Further, in a partial plan view of the tread portion, the widening portion of the outer first middle sipe 31 overlaps with such an extended region that the widening portion 21b of the first shoulder sipe 21 is extended along the length direction thereof.

Thereby, the outer first middle sipe 31 and the first shoulder sipe 21 work together to further improve the wet performance.

The first middle sipe 30 has a constant depth along the length thereof. More specifically, each of the outer first middle sipes 31 and the inner first middle sipes 32 has a constant depth along the length thereof.

For example, the depth of the inner first middle sipe 32 is set in a range from 70% to 100% of the depth of the circumferential groove 3.

Further, the maximum depth of the outer first middle sipe 31 is smaller than the maximum depth of the inner first middle sipe 32.

The maximum depth of the outer first middle sipe 31 is in a range from 30% to 70% of the maximum depth of the inner first middle sipe 32, and preferably set in a range from 1.0 to 2.5 mm.

The cross-sectional shape shown in FIG. 6 can be applied to the outer first middle sipe 31 and the inner first middle sipe 32.

Such outer first middle sipes 31 and inner first middle sipes 32 can change their pitch sound into white noise to improve noise performance, and improve ride comfort and steering stability in a well-balanced manner.

As shown in FIG. 3, the first middle land portion 12 in the present embodiment is provided with a first circumferential sipe 33 extending in the tire circumferential direction.

The first circumferential sipe 33 in this example continuously extends in the tire circumferential direction.

Such first circumferential sipe 33 provides a frictional force in the tire axial direction useful for running in wet conditions.

Further examples of the first circumferential sipe 33 will be described later.

The first circumferential sipe 33 is disposed in a central part in the tire axial direction of the first middle land portion 12 when axially divided into three equal parts.

Preferably, the distance in the tire axial direction from the first circumferential sipe 33 to the center in the tire axial direction of the first middle land portion 12 is set to be not more than 10%, more preferably not more than 5% of the axial width W7 of the first middle land portion 12.

Such arrangement of the first circumferential sipe 33 can suppress uneven wear of the first middle land portion 12.

Figure 7:
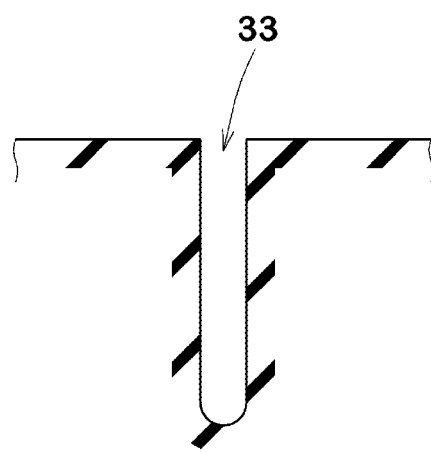
FIG. 7 is a cross-sectional view taken along line D-D of FIG. 3.

FIG. 7 is a cross sectional view of the first circumferential sipe 33 view taken along line D-D of FIG. 3.

As shown, the first circumferential sipe 33 has a constant width from the open top end to the bottom.

Figure 8:
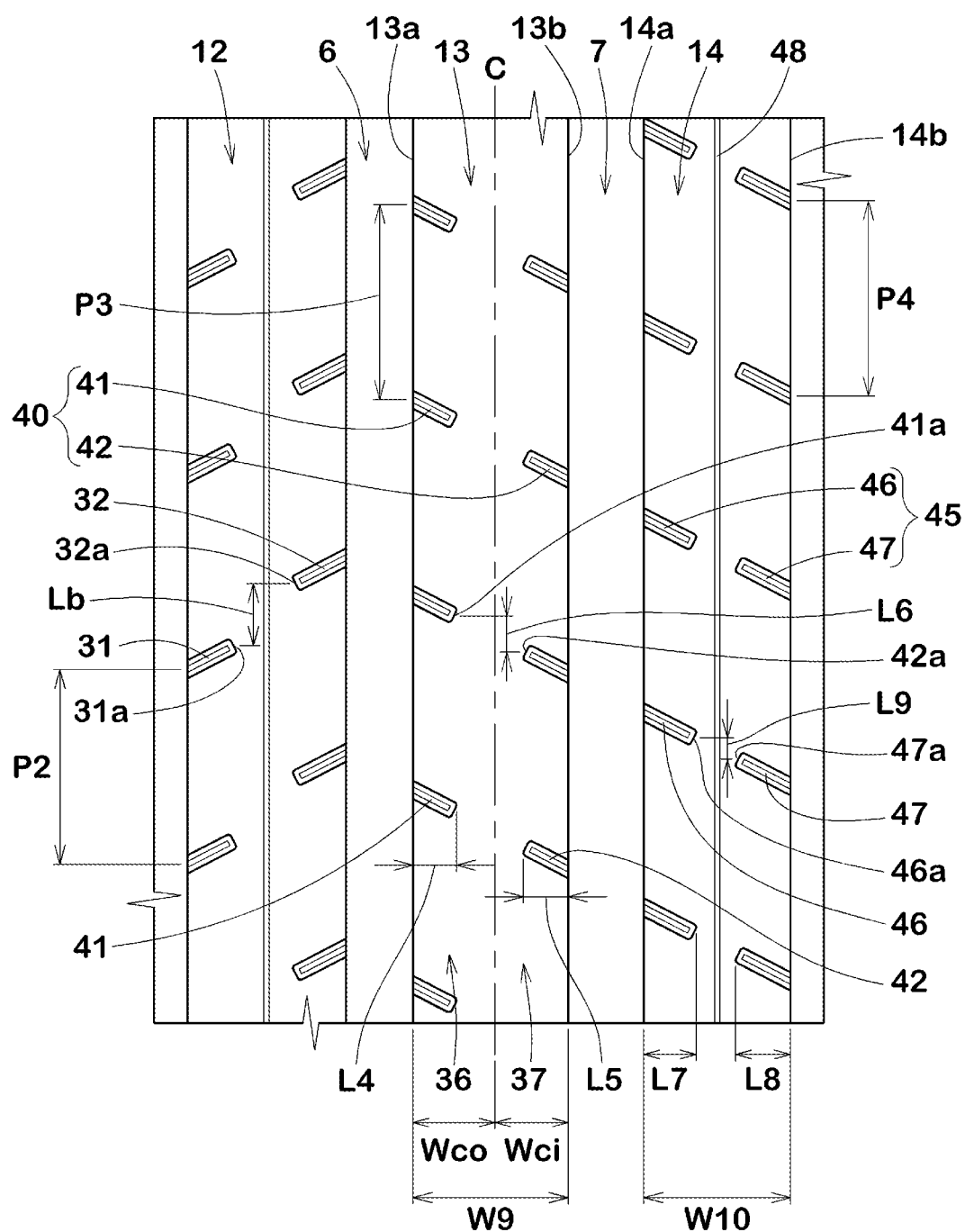
FIG. 8 is a partial view of the tread portion showing the first middle land portion, the crown land portion, and the second middle land portion show in FIG. 1

FIG. 8 shows the first middle land portion 12, the crown land portion 13, and the second middle land portion 14.

As shown, the crown land portion 13 has a first axial edge 13a on the first tread edge T1 side, a second axial edge 13b on the second tread edge T2 side, and a ground contacting surface between the first axial edge 13a and the second axial edge 13b.

The second middle land portion 14 has a first axial edge 14a on the first tread edge T1 side, a second axial edge 14b on the second tread edge T2 side, and a ground contacting surface between the first axial edge 14a and the second axial edge 14b.

The crown land portion 13 has an outside ground contacting area 36 on the first tread edge T1 side of the tire equator C, and an inside ground contacting area 37 on the second tread edge T2 side of the tire equator C. In the present embodiment, the axial width Wco of the outside ground contacting area 36 is larger than the axial width Wci of the inside ground contacting area 37.

The crown land portion 13 satisfying such condition (Wco>Wci) helps to improve the steering stability.

For example, the axial width Wco of the outside ground contacting area 36 is set in a range from 51% to 60%, preferably 51% to 55% of the axial width W9 of the crown land portion 13. Thereby, the steering stability is improved while uneven wear of the crown land portion 13 is suppressed.

The crown land portion 13 is provided with only sipes in order to improve the rigidity of the crown land portion 13.

The crown land portion 13 is provided with a plurality of crown sipes 40 inclined with respect to the tire axial direction to a second direction opposite to the above-mentioned first direction (inclined downward to the right in each drawing).

In the present embodiment, the crown sipes 40 extends linearly while inclining to the second direction.

Such crown sipes 40 cooperate with the first middle sipes 30 to provide frictional forces in multiple directions and improve wet performance.

As shown in FIG. 3, one pitch length P3 in the tire circumferential direction of the crown sipes 40 is, for example, set in a range from 80% to 120% of one pitch length P2 in the tire circumferential direction of the first middle sipes 30.

Such sipe arrangement improves uneven wear resistance.

The angles of the crown sipes 40 with respect to the tire axial direction are preferably not less than 20 degrees, more preferably not less than 25 degrees, but preferably not more than 45 degrees, more preferably not more than 40 degrees. Such crown sipes 40 provide frictional forces in the tire circumferential direction and axial direction in a well-balanced manner.

The crown sipe 40 includes:
an outside crown sipe 41 extending from the first axial edge 13a and having a terminal end 41a within the crown land portion 13; and
an inside crown sipe 42 extending from the second axial edge 13b and having a terminal end 42a within the crown land portion 13.

The angle difference between the outside crown sipe 41 and the inside crown sipe 42 is preferably not more than 10 degrees, more preferably not more than 5 degrees, and in the present embodiment, these sipes 41 and 42 are arranged in parallel with each other.

Such outside crown sipes 41 and inside crown sipes 42 suppress uneven wear of the crown land portion 13.

Each of the outside crown sipes 41 and the inside crown sipes 42 is terminated so that the terminal end is positioned not beyond a center in the tire axial direction of the crown land portion 13.

The axial length L4 of the outside crown sipe 41 and the axial length L5 of the inside crown sipe 42 are, for example, set in a range from 20% to 35% of the axial width W9 of the crown land portion 13.

Such outside crown sipes 41 and inside crown sipes 42 improve steering stability and ride comfort in a well-balanced manner.

It is preferable that the outside crown sipes 41 are shifted in the tire circumferential direction from the inside crown sipes 42.

In the present embodiment, thereby, the inside crown sipe 42 does not overlap with such an extended region that the outside crown sipe 41 is extended in parallel to the tire axial direction in a partial plan view of the tread portion.

Further, the terminal ends 41a of the outside crown sipes 41 are shifted in the tire circumferential direction from the terminal ends 42a of the inside crown sipes 42.

It is preferable that the distance L6 in the tire circumferential direction between the terminal end 41a of the outside crown sipe 41 and the terminal end 42a of the inside crown sipe 42 is smaller than
the distance Lb in the tire circumferential direction between the terminal end 31a of the outer first middle sipe 31 and the terminal end 32a of the inner first middle sipe 32.

Specifically, the distance L6 is preferably not more than 70%, more preferably not more than 60%, but preferably not less than 30%, more preferably not less than 40% of the distance Lb.

Such arrangement of the sipes can change their pitch sound into white noise to improve the noise performance.

Each of the outside crown sipes 41 and the inside crown sipes 42 has a constant depth along the length thereof.

The depth of the inside crown sipe 42 is, for example, set in a range from 70% to 100% of the depth of the circumferential groove 3.

The maximum depth of the outside crown sipe 41 is smaller than the maximum depth of the inside crown sipe 42.

The maximum depth of the outside crown sipe 41 is set in a range from 30% to 70% of the maximum depth of the inside crown sipe 42, and preferably set in a range from 1.0 to 2.5 mm.

Each of the outside crown sipe 41 and the inside crown sipe 42 can be provided with the cross-sectional shape of the first middle sipe 30 described with reference to FIG. 6.

The second middle land portion 14 is provided with only sipes so as not to decrease the rigidity of the second middle land portion 14.

The second middle land portion 14 is provided with a plurality of second middle sipes 45 inclined with respect to the tire axial direction to the above-mentioned second direction.

In the present embodiment, the second middle sipes 45 extend linearly while inclining to the second direction.

As shown in FIG. 8, one pitch length P4 in the tire circumferential direction of the second middle sipes 45 is, for example, in a range from 80% to 120% of one pitch length P3 in the tire circumferential direction of the crown sipes 40.

In the present embodiment, these pitch lengths P3 and P4 are the same.

Such sipe arrangement improves uneven wear resistance.

The angle of the second middle sipe 45 with respect to the tire axial direction is preferably not less than 20 degrees, more preferably not less than 25 degrees, but preferably not more than 45 degrees, more preferably not more than 40 degrees.

Such second middle sipes 45 provide frictional forces in the tire circumferential direction and axial direction in a well-balanced manner.

The second middle sipe 45 includes
an outside second middle sipe 46 extending from the first axial edge 14a and having a terminal end 46a within the crown land portion 13, and
an inside second middle sipe 47 extending from the second axial edge 14b and having a terminal end 47a within the crown land portion 13.

The angle difference between the outside second middle sipe 46 and the inside second middle sipe 47 is preferably not more than 10 degrees, more preferably not more than 5 degrees. In the present embodiment, these are arranged in parallel with each other.

Such outside second middle sipes 46 and inside second middle sipes 47 suppress uneven wear of the second middle land portion 14.

Each of the outside second middle sipes 46 and the inside second middle sipes 47 is terminated so that the terminal end is positioned not beyond a center in the tire axial direction of the second middle land portion 14. The axial lengths L7 of the outside second middle sipe 46 and the axial length L8 of the inside second middle sipe 47 are, for example, larger than the axial lengths L4 of the outside crown sipe 41 and the axial length L5 of the inside crown sipe 42.

Specifically, the axial length L7 of the outside second middle sipe 46 and the axial length L8 of the inside second middle sipe 47 are in a range from 25% to 35% of the axial width W10 of the second middle land portion 14.

Such outside second middle sipes 46 and inside second middle sipes 47 help to improve wet performance and riding comfort.

It is preferable that the outside second middle sipes 46 are shifted in the tire circumferential direction from the inside second middle sipes 47 Thereby, in the present embodiment, the overlapping area of the inside second middle sipe 47 with such an extended region that the outside second middle sipe 46 is extended in parallel with the tire axial direction in a partial plan view of the tread portion, is not more than 10% of the opening area of the inside second middle sipe 47.

Further, the terminal ends 46a of the outside second middle sipes 46 are shifted in the tire circumferential direction from the terminal ends 47a of the inside second middle sipes 47.

The distance L9 in the tire circumferential direction between the terminal end 46a of the outside second middle sipe 46 and the terminal end 47a of the inside second middle sipe 47 is smaller than the distance Lb in the tire circumferential direction between the terminal end 31a of the outer first middle sipe 31 and the terminal end 32a of the inner first middle sipe 32, and preferably smaller than the distance L6 in the tire circumferential direction between the terminal end 41a of the outside crown sipe 41 and the terminal end 42a of the inside crown sipe 42.

Specifically, the distance L9 is preferably not more than 80%, more preferably not more than 70%, but preferably not less than 40%, more preferably not less than 50% of the distance L6.

Such arrangement of the sipes optimizes the rigidity balance of the land portions and improves steering stability and ride comfort in a well-balanced manner.

Each of the outside second middle sipes 46 and the inside second middle sipes 47 has a constant depth along the length thereof.

The depth of the inside second middle sipe 47 is, for example, set in a range from 70% to 100% of the depth of the circumferential groove 3.

The maximum depth of the outside second middle sipe 46 is smaller than the maximum depth of the inside second middle sipe 47.

The maximum depth of the outside second middle sipe 46 is in a range from 30% to 70% of the maximum depth of the inside second middle sipe 47, and preferably set in a range from 1.0 to 2.5 mm.

Such outside crown sipes 41 and inside crown sipes 42 can change their pitch sound into white noise to improve the noise performance, and improve ride comfort and steering stability in a well-balanced manner.

Each of the outside second middle sipe 46 and the inside second middle sipe 47 can be provided with the cross-sectional shape of the first middle sipe 30 described with reference to FIG. 6.

The second middle land portion 14 in the present embodiment is provided with a second circumferential sipe 48 extending in the tire circumferential direction.

The second circumferential sipe 48 extends continuously in the tire circumferential direction. The second circumferential sipe 48 has the same cross-sectional shape as the first circumferential sipe 33. Such second circumferential sipe 48 provides a frictional force in the tire axial direction.

The second circumferential sipe 48 is disposed, for example, in a central part of the second middle land portion 14 when axially divided into three equal parts.

The distance in the tire axial direction from the second circumferential sipe 48 to the center in the tire axial direction of the second middle land portion 14 is preferably not more than 10%, more preferably not more than 5% of the axial width W10 of the second middle land portion 14.

Figure 9:
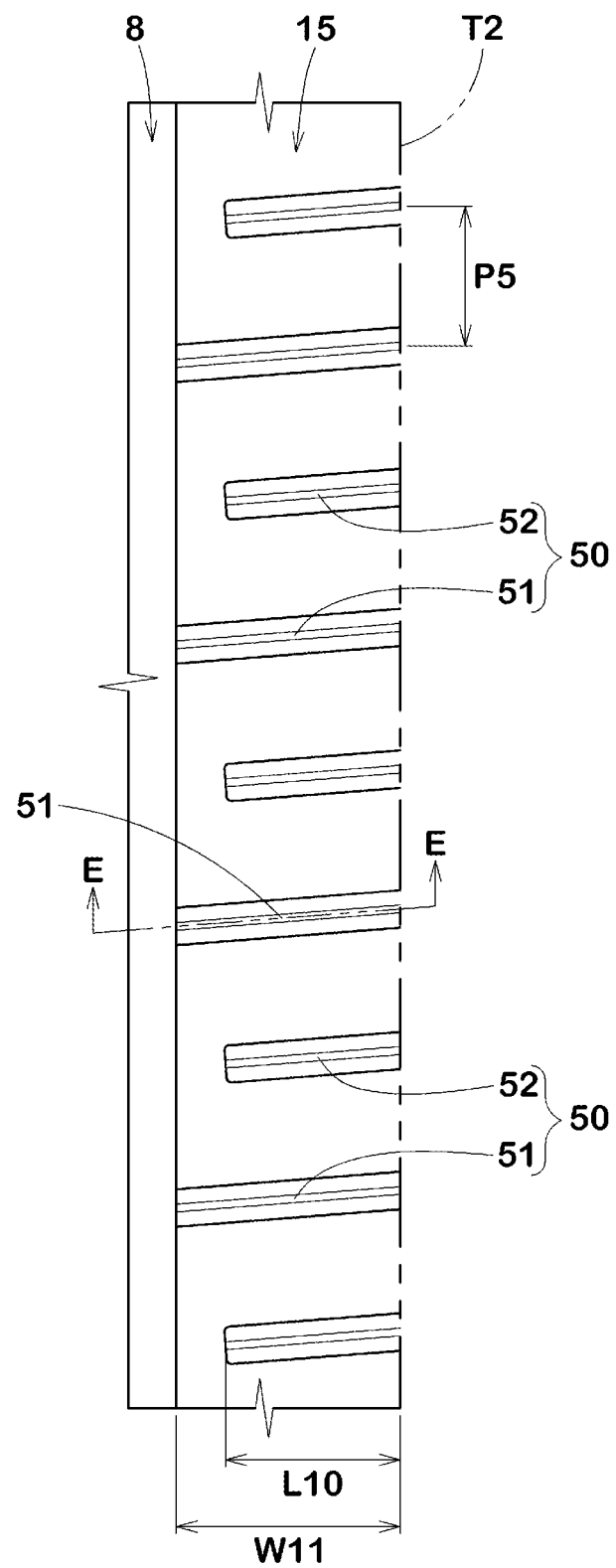
FIG. 9 is a partial top view of the second shoulder land portion show in FIG. 1.

FIG. 9 shows the second shoulder land portion 15 of FIG. 1.

As shown, the second shoulder land portion 15 is provided with only sipes so as not to decrease the rigidity of the second middle land portion 14.

The second shoulder land portion 15 is provided with a plurality of second shoulder sipes 50 extending in the tire axial direction.

In the present embodiment, the total number of the second shoulder sipes 50 is larger than the total number of the first shoulder sipes 21.

Such sipe arrangement improves noise performance and wet performance.

In order to improve the noise performance and wet performance while maintaining steering stability, the total number of second shoulder sipes 50 is preferably not less than 1.3 times, more preferably not less than 1.5 times, still more preferably not less than 1.8 times, but preferably not more than 2.8 times, more preferably not more than 2.5 times, still more preferably not more than 2.2 times the total number of first shoulder sipes 21.

As shown in FIG. 9, one pitch length P5 in the tire circumferential direction of the second shoulder sipes 50 is preferably set in a range from 30% to 70% of one pitch length P4 in the tire circumferential direction of the second middle sipes 45.

In the present embodiment, the second shoulder sipes 50 are inclined to the first direction. That is, the first shoulder sipes 21 and the second shoulder sipes 50 are inclined with respect to the tire axial direction to the same direction. The second shoulder sipes 50 in the present embodiment extends linearly while inclining to the first direction.

The angle of the second shoulder sipe 50 with respect to the tire axial direction is not more than 20 degrees, preferably not more than 15 degrees, more preferably not more than 10 degrees.
Thereby, in the present embodiment, the maximum angle of the first shoulder sipe 21 with respect to the tire axial direction is larger than the maximum angle of the second shoulder sipe 50 with respect to the tire axial direction. Owing to such sipe arrangement, the noise performance is further improved.

The second shoulder sipe 50 can be provided with the cross-sectional shape of the first shoulder sipe 21 described with reference to FIG. 4.

The second shoulder sipe 50 includes a traversing second shoulder sipe 51 extending across the entire axial width of the second shoulder land portion 15, and a terminating second shoulder sipe 52 extending from the second tread edge T2 and terminated to have a terminal end within the second shoulder land portion 15.

The terminating second shoulder sipe 52 has a longer axial length than any of the first middle sipe 30, the crown sipe 40 and the second middle sipe 45.

The axial length L10 of the second shoulder sipe 50 is preferably not less than 50%, more preferably not less than 60%, but preferably not more than 90%, more preferably not more than 80% of the axial width W11 of the second shoulder land portion 15.
Such terminating second shoulder sipes 52 improve ride comfort and steering stability in a well-balanced manner.

Figure 10:
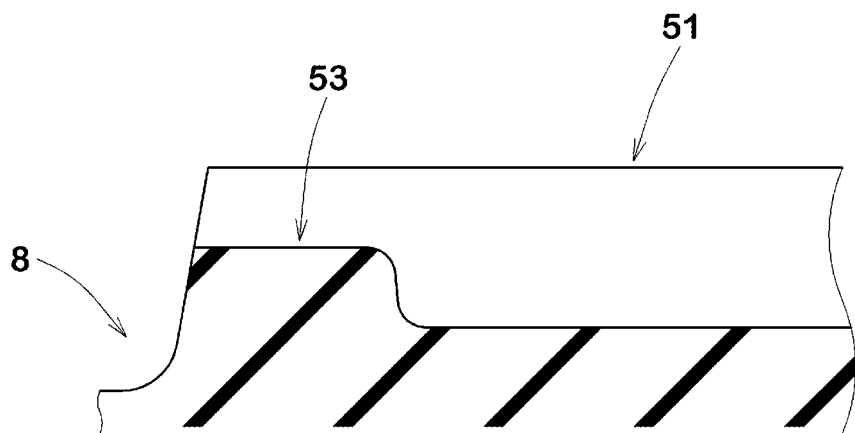
FIG. 10 is a cross-sectional view taken along line E-E of FIG. 9.

FIG. 10 is a cross-sectional view taken along line E-E of FIG. 9.
As shown, the traversing second shoulder sipe 51 comprises a shallow portion 53 formed by a locally raised bottom.
The shallow portion 53 in the present embodiment is formed in an end portion connected to the second shoulder circumferential groove 8.
The configuration of the shallow portion 23 (shown in FIG. 5) of the first shoulder sipe 21 is applied to the shallow portion 53 of the second shoulder sipe 50, therefore, the description thereof is omitted here.
The traversing second shoulder sipe 51 provided with such shallow portion 53 can maintain the rigidity of the second shoulder land portion 15 and improves steering stability.

In the present embodiment, as shown in FIG. 1, each of the five land portions 4 is provided with only the sipes 16, and lateral grooves for drainage are not provided. As a result, the rigidity of each land portion is maintained, and the pumping noise from lateral grooves is not generated. Thus, the noise performance is expected to be improved.

Hereinafter, other embodiments of the present disclosure will be described. In the drawings showing other embodiments, elements previously described are designated by the same reference numerals as those described above, and the above-described configurations can be applied.

Figure 11:
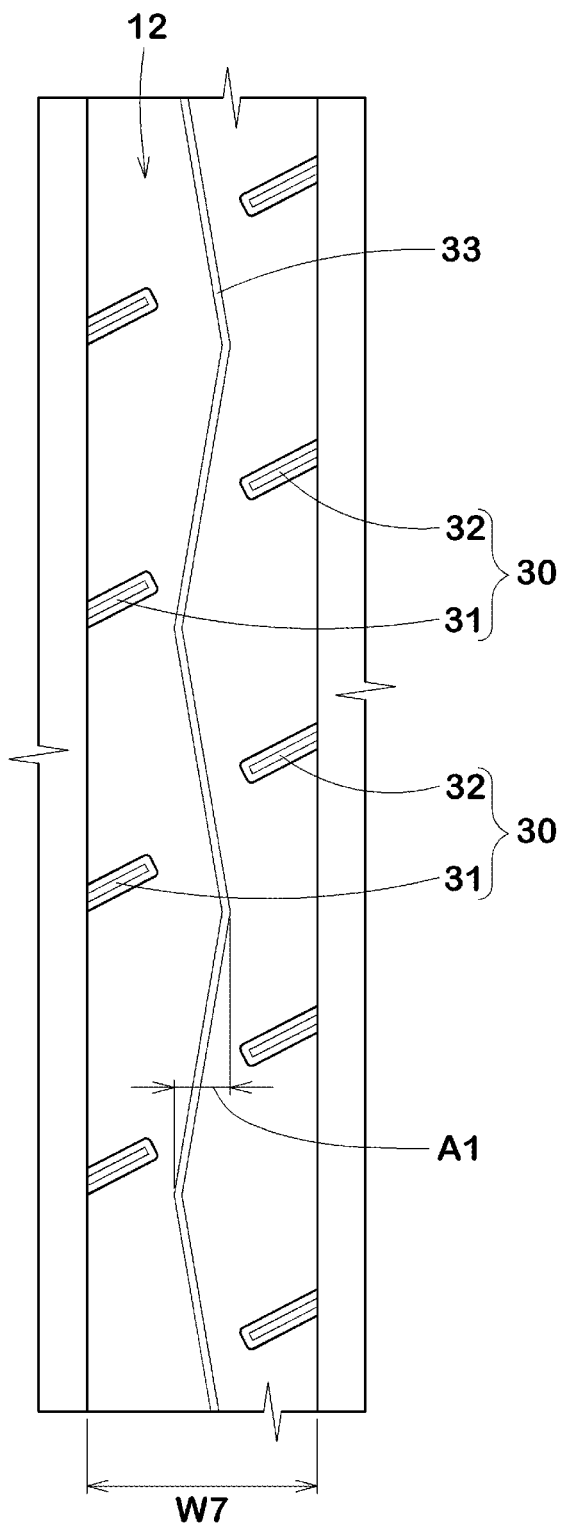
FIG. 11 is a partial top view of another example of the first middle land portion.

FIG. 11 shows the first middle land portion 12 of another embodiment. As shown, the first circumferential sipe 33 provided in the first middle land portion 12 extends in a zigzag shape in the tire circumferential direction. The first circumferential sipe 33 may extend along a smooth curve of a wavy shape.

The peak-to-peak amplitude A1 of zigzag of the first circumferential sipe 33 measured in the tire axial direction is, for example, set in a range from 1.0% to 8.0% of the axial width W7 of the first middle land portion 12. Further, as shown in FIG. 11, one cycle of the zigzag of the first circumferential sipe 33 corresponds to two pitches of the first middle sipes 30. The first circumferential sipe 33 is so arranged. Such first circumferential sipe 33 can also provide frictional forces in the tire circumferential direction.

Figure 12:
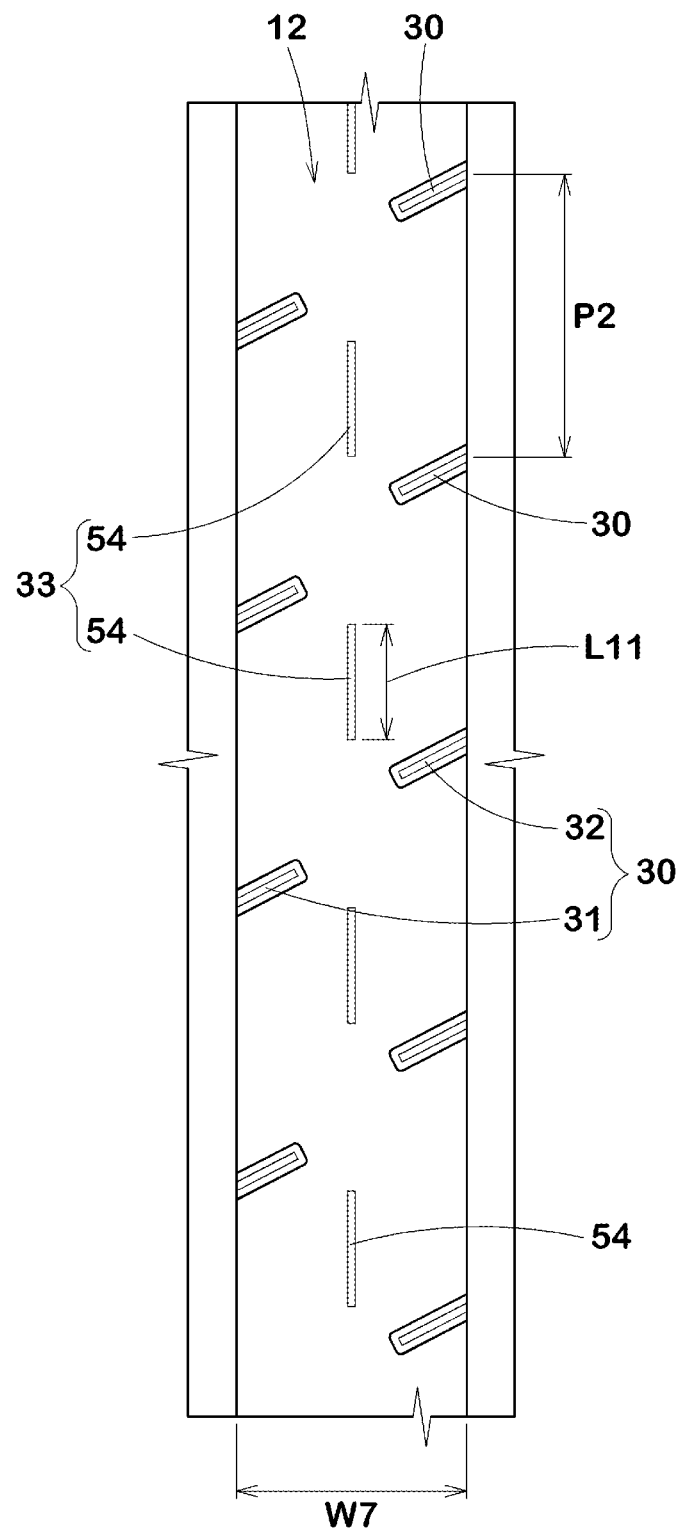
FIG. 12 is a partial top view of still another example of the first middle land portion.

FIG. 12 shows the first middle land portion 12 of still another embodiment. As shown, the first circumferential sipe 33 provided in the first middle land portion 12 extends intermittently in the tire circumferential direction. Thus, the first circumferential sipe 33 can be said as being composed of a plurality of sipe pieces 54 arranged circumferentially of the tire in line.
The circumferential length L11 of each of the sipe pieces 54 is, for example, set in a range from 20% to 60% of the circumferential pitch length P2 of the first middle sipes 30 adjacent to the sipe piece 54 concerned.
Such first circumferential sipe 33 can provide frictional forces in the tire axial direction while maintaining the rigidity of the first middle land portion 12.

The configurations of the first circumferential sipes 33 shown in FIGS. 11 and 12 can also be applied to the second circumferential sipe 48 provided in the second middle land portion 14.

Figure 13:
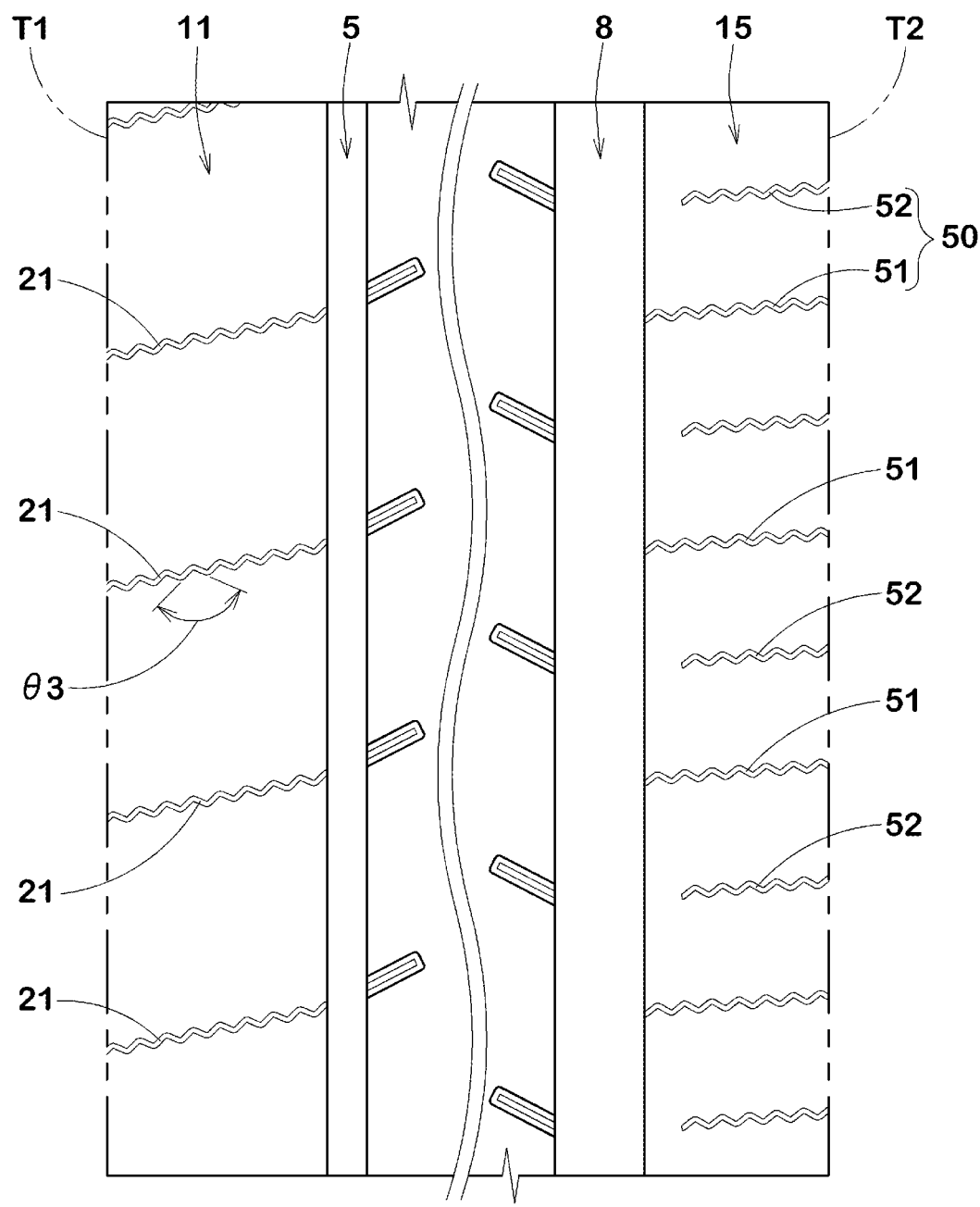
FIG. 13 shows the first shoulder land portion and the second shoulder land portion of another embodiment.

FIG. 13 shows the first shoulder land portion 11 and the second shoulder land portion 15 of still another embodiment.

Figure 14:
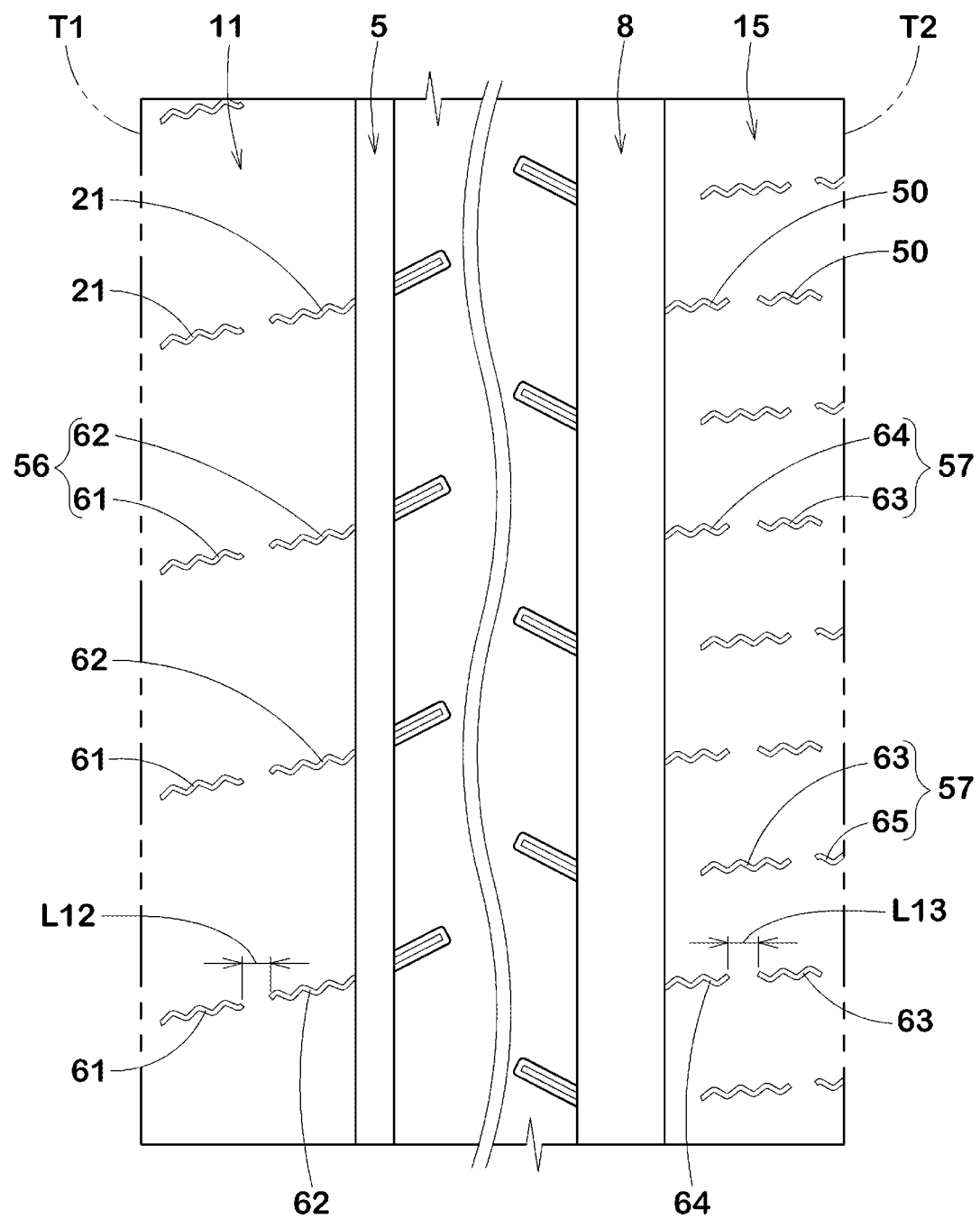
FIG. 14 shows the first shoulder land portion and the second shoulder land portion of still another embodiment.

FIG. 14 shows the first shoulder land portion 11 and the second shoulder land portion 15 of yet still another embodiment.

In the embodiment shown in FIG. 13, the first shoulder land portion 11 is provided with the first shoulder sipes 21 each extending in the tire axial direction in a wavy shape while oscillating in the tire circumferential direction in a partial plan view of the tread portion.
When the opposite sipe walls come into contact with each other, such first shoulder sipes 21 can increase the rigidity of the land portion, and can improve the steering stability.
Further, as compared with straight sipes, such first shoulder sipes 21 can alleviate the impact acting on the sipe edges at the time of contacting with the ground, and can suppress the noise at the time of contacting with the ground.

In this embodiment, the first shoulder sipes 21 extend from the first shoulder circumferential groove 5 to the first tread edge T1.
Further, the center line of amplitude of the first shoulder sipe 21 is inclined at an angle of not more than 30 degrees with respect to the tire axial direction.
Such first shoulder sipes 21 help to improve ride comfort and steering stability in a well-balanced manner.

In order to further enhance the above-mentioned effect, the second shoulder land portion 15 in this embodiment is provided with the second shoulder sipes 50 each extending in the tire axial direction in a wavy shape in a partial plan view of the tread portion, while oscillating in the tire circumferential direction.

In this embodiment, it is preferable that the second shoulder sipe 50 includes: the traversing second shoulder sipe 51 extending from the second shoulder circumferential groove 8 to the second tread edge T2; and the terminating second shoulder sipe 52 extending from the second tread edge T2 and terminated within the second shoulder land portion 15.

The traversing second shoulder sipes 51 and the terminating second shoulder sipes 52 are alternately arranged in the tire circumferential direction.

Thereby, noise performance is improved while maintaining steering stability.

In the embodiment shown in FIG. 14, the first shoulder land portion 11 is provided with a plurality of first sipe pairs 56, wherein each pair 56 consists of two kinds of the first shoulder sipes 21 each extending in the tire axial direction in a wavy shape and arranged side by side in the tire axial direction, and an axial distance L12 therebetween is 6 to 12 mm.

For example, the two kinds of the first shoulder sipes 21 are a closed sipe 61 whose both ends are terminated within the first shoulder land portion 11, and
a semi-open sipe 62 extending from the first shoulder circumferential groove 5 and terminated within the first shoulder land portion 11.

The first shoulder land portion 11 provided with such first sipe pairs 56 can improve noise performance and ride comfort while exhibiting excellent steering stability.

In order to further enhance the above-mentioned effect, the second shoulder land portion 15 is provided with a plurality of second sipe pairs 57, wherein each pair 57 consists of two kinds of the second shoulder sipes 50 each extending in the tire axial direction in a wavy shape and arranged side by side in the tire axial direction, and an axial distance L13 therebetween is 6 to 12 mm.

For example, the two kinds of the second shoulder sipes 50 are a closed sipe 63 whose both ends are terminated within the second shoulder land portion 15, and a semi-open sipe 64 extending from the second shoulder circumferential groove 8 and terminated within the second shoulder land portion 15.

As another example, the two kinds of the second shoulder sipes 50 may be the above-mentioned closed sipe 63, and a tread-edge-side sipe 65 extending axially inwardly from the second tread edge T2.

As shown in FIG. 13, The above-described first shoulder sipes 21 and second shoulder sipes 50 having wavy configurations extend in a triangular waveform which is bent at an angle θ3 of 90 to 130 degrees, for example, and the peak-to-peak amplitude is, for example, in a range from 1.0 to 1.6 mm.

The wavy configurations for the shoulder sipes 21 and 50 are not limited to the above-described triangular waveform. For example, a wavy configuration such that a plurality of semicircles having a radius of 0.6 to 1.4 mm for example, are connected in series, may be adopted. Further, aside from these configurations, various waveforms such as sine wave, square wave and trapezoidal wave may be adopted.

The above-described wavy shoulder sipes 21 and 50 may be configured as a so-called 3D sipe that undulates in the sipe depth direction in addition to the sipe length direction. As a result, the above-mentioned effects are further exerted.

When such 3D shoulder sipes are provided, it is preferable that each of the middle sipes is configured such that the two opposite sipe walls are flat.

Further, the wavy sipes shown in FIGS. 13 and 14 do not provided with the above-described widening portion, and extend in the depth direction at a constant width from the tread surface to the sipe bottom. Thereby, the sipe edges can exert greater frictional forces.

Hereinafter, further embodiments of the present disclosure will be described. In the figure showing the embodiments described below, the elements already described are designated by the same reference numerals as those described above, and the above-described configuration can be applied.

Figure 15:
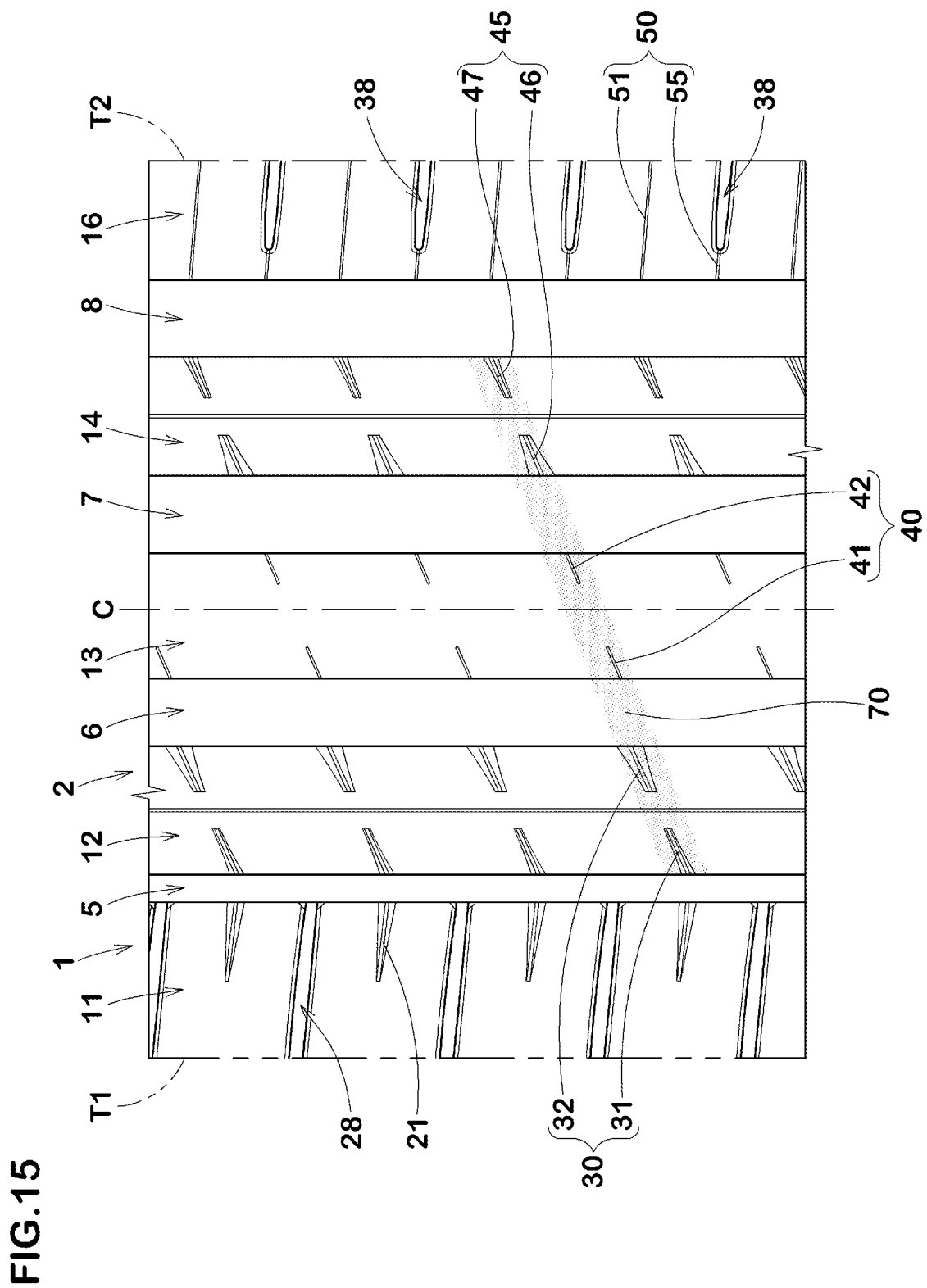
FIG. 15 is a developed partial view of a tread portion of a tire as another embodiment of the present disclosure.
Figure 16:
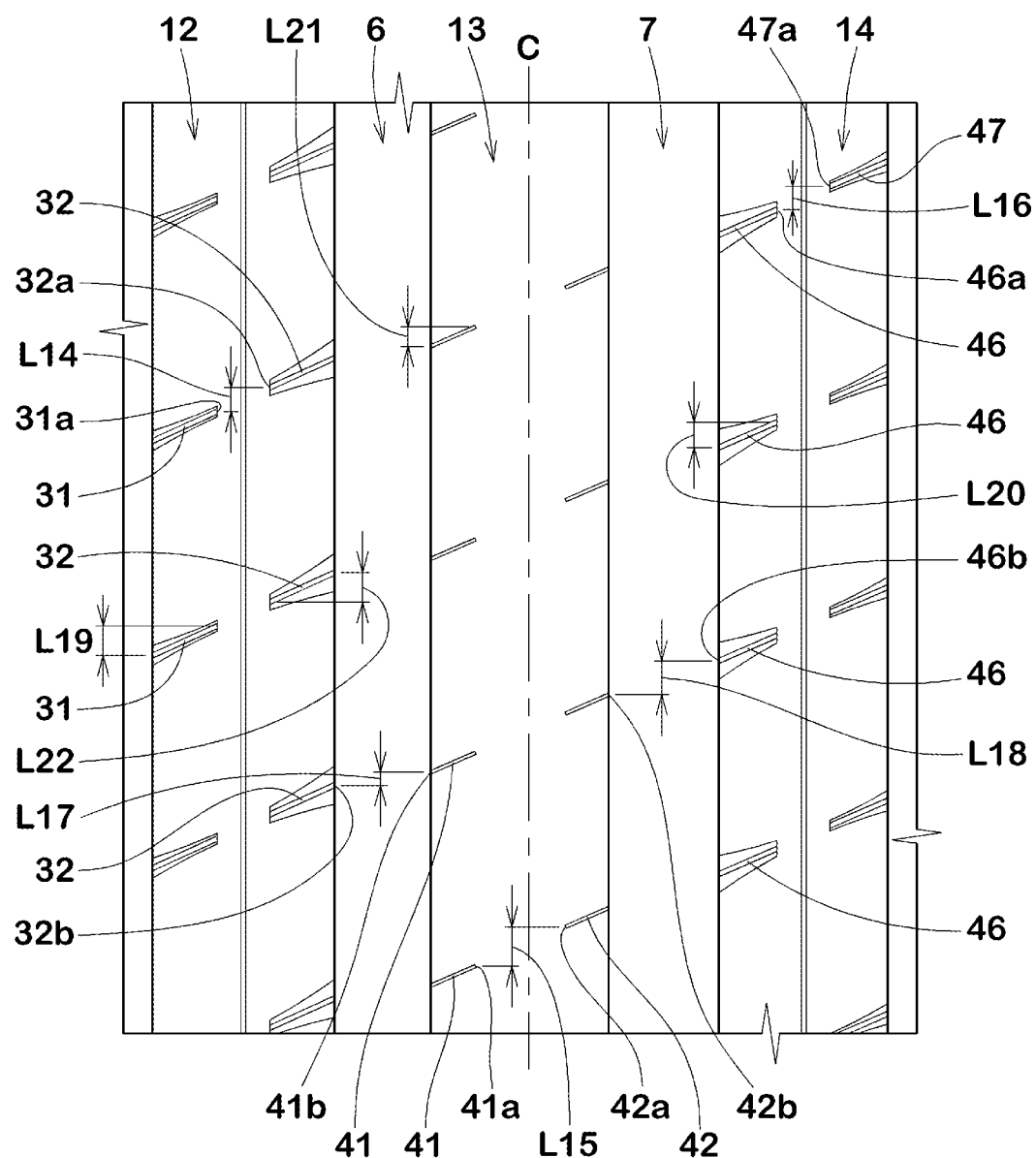
FIG. 16 is a partial view of the tread portion showing the first middle land portion, the crown land portion, and the second middle land portion show in FIG. 15.

FIG. 15 shows the tread portion 2 of another embodiment, and FIG. 16 shows the first middle land portion 12, the crown land portion 13, and the second middle land portion 14 of this embodiment.

In this embodiment, mainly the sipes provided in the land portions are modified from the above-described embodiment. With respect to the widths of the respective land portions, the configurations already described in the former embodiments can be applied to this embodiment.

In this embodiment, as shown in FIG. 16, the sipes provided in the first middle land portion 12, the crown land portion 13 and the second middle land portion 14 are inclined with respect to the tire axial direction in the same direction, specifically, inclined with respect to the tire axial direction to the first direction (upward to the right).

The angle of each sipe with respect to the tire axial direction is, for example, 10 to 30 degrees.

With such arrangement of the sipes, the deformation of each land portion at the time of contacting with the ground can be made uniform, and the ground contact pressure acting on the land portions can be made uniform.

As a result, the land portions can cooperate with each other to exert a large grip force.

In each of the first middle land portion 12, the crown land portion 13, and the second middle land portion 14, the sipes adjacent to each other in the tire axial direction are preferably shifted from each other in the tire circumferential direction.

Further, every two of the sipes adjacent to each other in the tire axial direction via the first crown circumferential groove 6 or the second crown circumferential groove 7 (specifically, a pair of the inner first middle sipe 32 and the outside crown sipe 41, and a pair of the outside second middle sipe 46 and the inside crown sipe 42) are preferably arranged so that the two sipes are shifted from each other in the tire circumferential direction.

Specifically, it is preferable that the two sipes are arranged so that the overlapping area of such an extended region that one of the two sipes is extended in parallel to the tire axial direction with the other of the two sipes, is not more than 10% of the opening area of the other of the two sipes in a partial plan view of the tread portion.

Thereby, the pitch sounds from the two sipes are less likely to overlap, and the noise performance is improved.

In this embodiment, as shown in FIG. 15, in a partial plan view of the tread portion, one of the outer first middle sipe 31 and one of the inner first middle sipe 32 provided in the first middle land portion 12, one of the outside crown sipe 41 and one of the inside crown sipe 42 provided in the crown land portion 13, and one of the outside second middle sipe 46 and one of the inside second middle sipe 47 provided in the second middle land portion 14, are disposed within a linearly-extending narrow strip area 70 (dotted area in FIG. 15).

This strip area 70 extends with a constant width, and the inclining directions of the area 70 and the sipes therein are the same.

Preferably, the constant width of the strip area 70 is not more than 30 mm, more preferably not more than 20 mm.

Thereby, the grip performance and the noise performance are further improved.

In the embodiment, the following distances (shown in FIG. 16) are appropriately defined as described later:

the distance L14 in the tire circumferential direction between
the terminal end 31a of the outer first middle sipe 31 and
the terminal end 32a of the inner first middle sipe 32;

the distance L15 in the tire circumferential direction between
the terminal end 41a of the outside crown sipe 41 and
the terminal end 42a of the inside crown sipe 42;

the distance L16 in the tire circumferential direction between
the terminal end 46a of the outside second middle sipe 46 and
the terminal end 47a of the inside second middle sipe 47;

the distance L17 in the tire circumferential direction between
the end 32b on the first crown circumferential groove 6 side of the inner first middle sipe 32 and
the end 41b on the first crown circumferential groove 6 side of the outside crown sipe 41; and the distance L18 in the tire circumferential direction between the end 46b on the second crown circumferential groove 7 side of the second middle sipe 46 and
the end 42b on the second crown circumferential groove 7 side of the inside crown sipe 42.

If these distances are large, the ground contacting pressure acting on the land portions tends to become uneven, and the grip performance may be deteriorated. If these distances are small, the pitch sound from the sipes tends to overlap, and the noise performance may be deteriorated.

From such a viewpoint, the distance L14 is preferably not less than 30%, more preferably not less than 50%, but preferably not more than 200%, more preferably not more than 150% of the maximum length L19 in the tire circumferential direction of the outer first middle sipe 31 or the inner first middle sipe 32.

Similarly, the distance L16 is preferably not less than 30%, more preferably not less than 50%, but preferably not more than 200%, more preferably not more than 150% of the maximum length L20 in the tire circumferential direction of the outside second middle sipe 46 or the inside second middle sipe 47.

As a result, noise performance and grip performance are improved in a well-balanced manner.

The distance L15 is preferably not less than 100%, more preferably not less than 150%, but preferably not more than 300%, more preferably not more than 250% of the maximum length L21 of in the tire circumferential direction of the outside crown sipe 41 or the inside crown sipe 42.

Meanwhile, since a large ground contacting pressure acts on the crown land portion 13, the arrangement of the sipes disposed in the crown land portion 13 has a large influence on various performances. Thus, it is desirable that the arrangement is more accurately defined.

Therefore, it is desirable that the distance L15 is set in a range from 200% of the length L21−1.0 mm to 200% of the length L21+1.0 mm.

The distance L17 is preferably not less than 10%, more preferably not less than 30%, but preferably not more than 150%, more preferably not more than 100% of the maximum length L22 in the tire circumferential direction of the inner first middle sipe 32 or the outside crown sipe 41.

The distance L18 is preferably not less than 50%, more preferably not less than 100%, but preferably not more than 250%, more than not more than 200% of the maximum length L20 in the tire circumferential direction of the outside second middle sipe 46 or the inside crown sipe 42.

In this embodiment, with respect to the cross sectional shape of the sipe, the outer first middle sipe 31, the inner first middle sipe 32,
the outside second middle sipe 46, and the inside second middle sipe 47 each have the same configuration as that shown in FIG. 6, that is,
each sipe comprises a main portion extending in the tire radial direction, and a widening portion opened at the ground contacting surface and having a width larger than the main portion. The widening portion has an inclined surface extending from the main portion to the ground contacting surface.

As shown in FIG. 16, each of the outer first middle sipe 31 and the inner first middle sipe 32, and the outside second middle sipe 46 and the inside second middle sipe 47 has the inclined surfaces sloping from both side edges of the sipe. Further, each of the inclined surfaces extends over the entire length of the sipe.

Further, the width of each inclined surface increases toward the inside or the outside in the tire axial direction.

It is preferable that the width of each inclined surface changes continuously in the tire axial direction.

However, the inclined surfaces are not limited to such configurations. The inclined surface may be provided in a part of the sipe in its longitudinal direction, or may extend in the longitudinal direction at a constant width.

Figure 17:
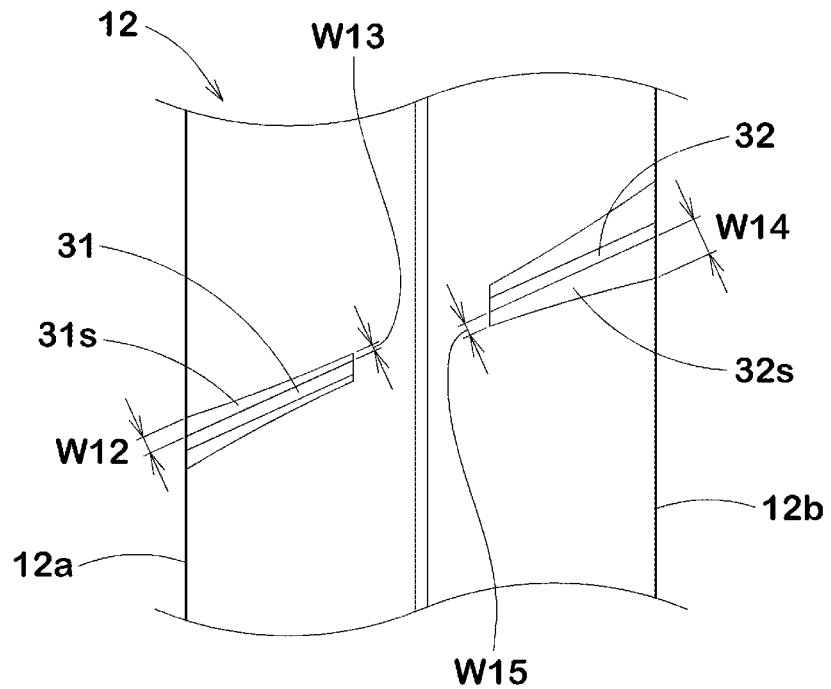
FIG. 17 is an enlarged view showing the outer first middle sipe and the inner first middle sipe show in FIG. 16.

FIG. 17 shows the outer first middle sipe 31 and the inner first middle sipe 32 of FIG. 16. As shown, in each of the inclined surfaces 31s of the outer first middle sipe 31 in its top view, the width W12 at the end on the first axial edge 12a side is preferably larger than the width W13 at the end on the second axial edge 12b side.

For example, the width W12 is in a range from 1.5 to 4.0 times the width W13. Further, in each of the inclined surfaces 32s of the inner first middle sipe 32 in its top view, the width W14 at the end on the second axial edge 12b side is preferably larger than the width W15 at the end on the first axial edge 12a side.

For example, the width W14 is preferably in a range from 2.5 to 5.0 times the width W15.

As a result, the entire inclined surface can contact with the ground, and a uniform ground contact pressure is applied to the entire inclined surface, therefore, excellent grip performance is exhibited.

Each width (W12-W15) of the inclined surface means the width measured in parallel with the tread surface in the cross section of the sipe perpendicular to the length direction of the sipe.

It is preferable that the width W12 of each inclined surface 31s of the outer first middle sipe 31 is smaller than the width W14 of each inclined surface 32s of the inner first middle sipe 32. For example, the width W12 is set in a range from 40% to 60% of the width W14.

As a result, the inclined surface is largely inclined in a second axial edge 12b side portion where the contact pressure is relatively large, therefore, the above-mentioned effect can be surely obtained.

Figure 18:
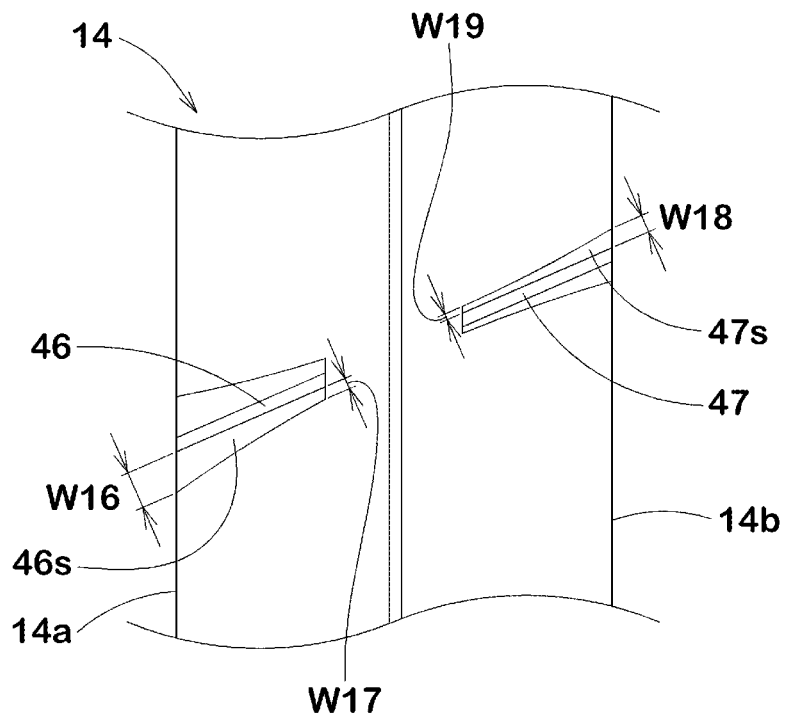
FIG. 18 is an enlarged view showing the outer second middle sipe and the inner second middle sipe show in FIG. 16.

FIG. 18 shows the outside second middle sipe 46 and the inside second middle sipe 47. As shown, in each inclined surface 46s of the outside second middle sipe 46, the width W16 at the end on the first axial edge 14a side is preferably larger than the width W17 at the end on the second axial edge 14b side. For example, the width W16 is set in a range from 2.5 to 5.0 times the width W17.

Further, in each inclined surface 47s of the inside second middle sipe 47, the width W18 at the end on the second axial edge 14b side is preferably larger than the width W19 at the end on the first axial edge 14a side. For example, the width W18 is set in a range from 1.5 to 4.0 times the width W19. As a result, excellent grip performance is exhibited.

It is preferable that the width W18 of the inclined surface 47s of the inside second middle sipe 47 is smaller than the width W16 of the inclined surface 46s of the outside second middle sipe 46. For example, the width W18 is in a range from 40% to 60% of the width W16.

As shown in FIGS. 17 and 18, it is preferable that the maximum width of each inclined surface 31s of the outer first middle sipe 31 and the maximum width of each inclined surface 47s of the inside second middle sipe 47 are set in a range from 0.5 to 2.5 mm.

It is preferable that the maximum width of each inclined surface 32s of the inner first middle sipe 32 and the maximum width of each inclined surface 46s of the outside second middle sipe 46 are set in a range from 1.5 to 3.5 mm.

It is preferable that the maximum depth (maximum radial dimension) of each inclined surface 31s of the outer first middle sipe 31 and the maximum depth (maximum radial dimension) of each inclined surface 47s of the inside second middle sipe 47 are set in a range from 0.5 to 2.5 mm.

It is preferable that the maximum depth (maximum radial dimension) of each inclined surface 32s of the inner first middle sipe 32 and the maximum depth (maximum radial dimension) of each inclined surface 46s of the outside second middle sipe 46 are set in a range from 1.5 to 3.5 mm. These dimensions of the inclined surfaces are however not limited to the above ranges.

More preferably, the maximum depth of the inclined surfaces 32s of the inner first middle sipe 32 and the maximum depth of the inclined surfaces 46s of the outside second middle sipe 46 are larger than the maximum depth of the inclined surfaces 31s of the outer first middle sipe 31 and the maximum depth of the inclined surfaces 47s of the inside second middle sipe 47.
Thereby, the grip performance is further improved.

As shown in FIG. 16, each of the outside crown sipes 41 and the inside crown sipes 42 is not provided with a widening portion. Namely, the outside crown sipes 41 and the inside crown sipes 42 in this embodiment each have a cross-sectional shape as shown in FIG. 7, and the width is constant from the open end to the bottom.

Figure 19:
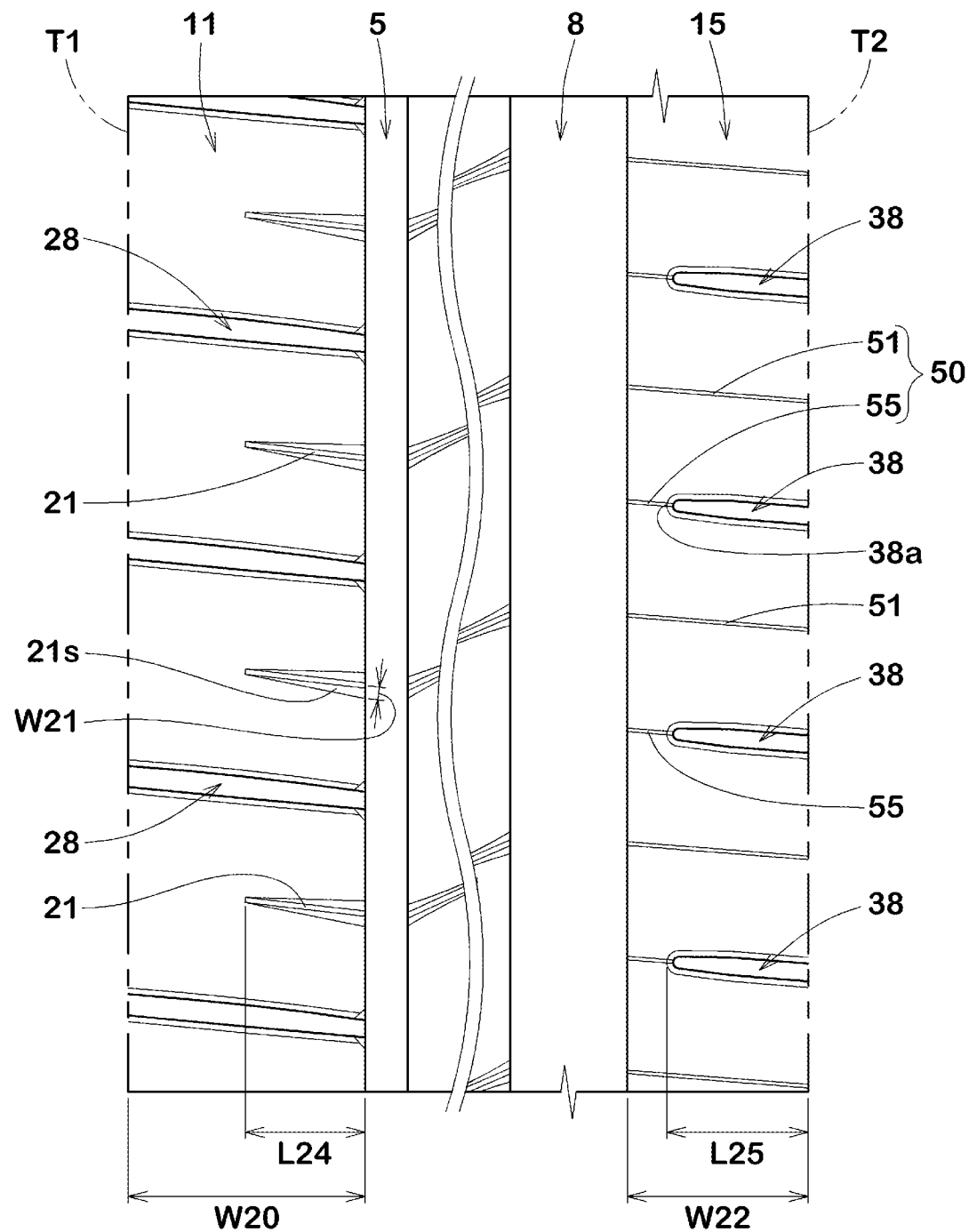
FIG. 19 shows of the first shoulder land portion and the second shoulder land portion show in FIG. 15.

FIG. 19 shows the first shoulder land portion 11 and the second shoulder land portion 15 of the embodiment shown in FIG. 15.

As shown, the first shoulder land portion 11 in this embodiment is provided with the first shoulder sipes 21, and a plurality of first shoulder lateral grooves 28.
The first shoulder lateral groove 28 extends from the first shoulder circumferential groove 5 to the first tread edge T1.
The first shoulder lateral groove 28 is inclined with respect to the tire axial direction to the above- mentioned second direction, for example.
The angle of the first shoulder lateral groove 28 with respect to the tire axial direction is, for example, in a range from 5 to 15 degrees.
Such first shoulder lateral grooves 28 help to improve wet performance.

The first shoulder sipes 21 are inclined with respect to the tire axial direction to the second direction in this example. The first shoulder sipes 21 extend along, preferably in parallel with, the first shoulder lateral grooves 28. The first shoulder sipes 21 in this embodiment extend from the first shoulder circumferential groove 5 and are terminated within the first shoulder land portion 11.
The length L24 in the tire axial direction of the first shoulder sipe 21 is, for example, set in a range from 40% to 60% of the axial width W20 of the first shoulder land portion 11.
Such first shoulder sipes 21 help to improve ride comfort and noise performance in a well-balanced manner.

The first shoulder sipe 21 has the same configuration as that shown in FIG. 6 with respect to the cross sectional shape of the sipe. That is, as shown in FIG. 6, the first shoulder sipe 21 comprises a main portion extending in the tire radial direction, and a widening portion opened at the ground contacting surface and having a width larger than that of the main portion. The widening portion has inclined surfaces extending from the main portion to the ground contacting surface.

As shown in FIG. 19, in this embodiment, inclined surfaces 21s are formed at both side edges of the first shoulder sipe 21.
Further, each inclined surface 21s extends over the entire length of the first shoulder sipe 21.
Further, the width of each inclined surface 21s of the first shoulder sipe 21 increases toward the inside in the tire axial direction.
The first shoulder sipes 21 having such inclined surfaces 21s help to to enhance the grip performance.

It is preferable that the maximum width W21 of each inclined surface 21s of the first shoulder sipe 21 is larger than the maximum width W12 (shown in FIG. 17) of the inclined surface 31s of the outer first middle sipe 31, and is smaller than the maximum width W14 (shown in FIG. 17) of the inclined surface 32s of the inner first middle sipe 32. Specifically, the maximum width W21 of the inclined surface 21s of the first shoulder sipe 21 is in a range from 60% to 90% of the width W14 of the inclined surface 32s of the inner first middle sipe 32.
As a result, uniform contact pressure is likely to act on the first shoulder land portion 11 and the first middle land portion 12, and the grip performance is further improved.

The second shoulder land portion 15 of this embodiment is provided with the second shoulder sipes 50 and a plurality of second shoulder lateral grooves 38.
The second shoulder lateral grooves 38 and the second shoulder sipes 50 are inclined with respect to the tire axial direction to the second direction. Preferably, the second shoulder lateral grooves 38 are arranged in parallel with the second shoulder sipes 50.

The second shoulder lateral grooves 38 extend axially inward from the second tread edge T2, and are terminated within the second shoulder land portion 15.
The length L25 in the tire axial direction of the second shoulder lateral groove 38 is, for example, in a range from 60% to 90% of the axial width W22 of the second shoulder land portion 15.

In this embodiment, the second shoulder sipe 50 is not provided with a widening portion. The second shoulder sipe 50 has a cross-sectional shape as shown in FIG. 7, and the width is constant from the open end to the bottom.

As shown in FIG. 19, in this embodiment, the second shoulder sipe 50 includes a traversing second shoulder sipe 51 and a connecting second shoulder sipe 55.
The traversing second shoulder sipe 51 extends across the entire axial width of the second shoulder land portion 15.
The connecting second shoulder sipe 55 extends from the terminal end 38a of the second shoulder lateral groove 38 to the second shoulder circumferential groove 8, and connects between the second shoulder lateral groove 38 and the second shoulder circumferential groove 8.
Such second shoulder sipe 50 helps to improve the noise performance and the riding comfort in a well-balanced manner.

In this embodiment, the first shoulder land portion 11 and the second shoulder land portion 15 are provided with the lateral grooves 28 and 38.
But, sipes may be provided instead of these lateral grooves.
In this case, the pumping sound due to the lateral grooves is not generated, and the noise performance is further improved.

While detailed description has been made of preferable embodiments of the present disclosure, the present disclosure can be embodied in various forms without being limited to the illustrated embodiments.

Comparison Tests

Figure 20:
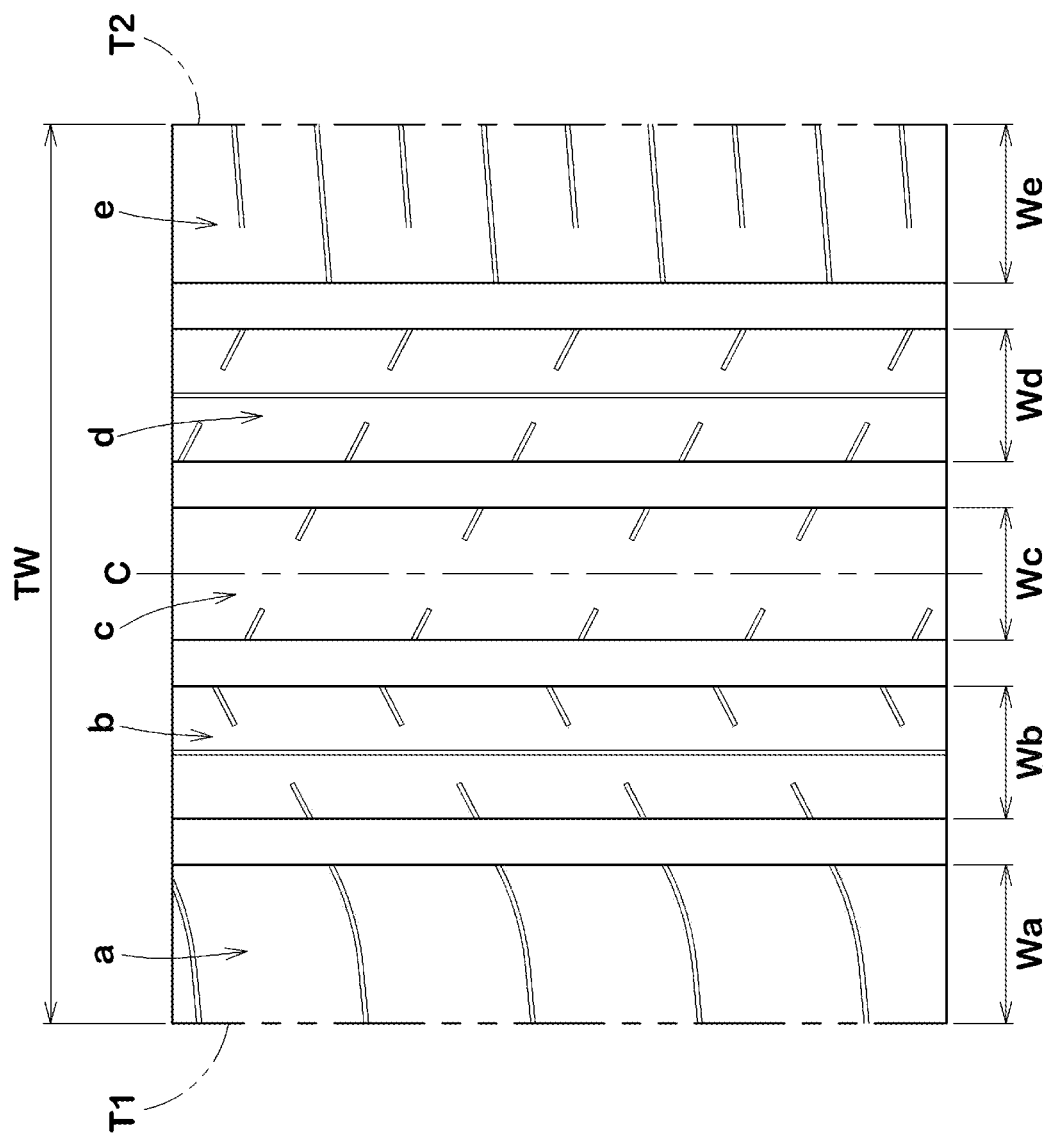
FIG. 20 is a developed partial view of the tread portion of the reference tire.

Based on the tread pattern shown in FIG. 1, pneumatic tires of size 235155R19 having specifications shown in Table 1 were experimentally manufactured as test tires (Ex. 1-Ex. 20).
Further, as a reference tire for comparing noise performance, a tire having the tread pattern shown in FIG. 20 was manufactured.
In the tread pattern of the reference tire, the widening portions of all the sipes shown in FIG. 1 were omitted.
Further, the width Wa of the first shoulder land portion "a" and the width We of the second shoulder land portion "e" were the same. Further, the width Wb of the first middle land portion "b", the width Wc of the crown land portion "c", and the width Wd of the second middle land portion "d" were the same. Further, the widths Wa and We were larger than the widths Wb, Wc and Wd.
As a result, under the 50% load condition of the reference tire,
axial widths W1$s$, W1$m$, Wc, W2$m$ and W2$s$ of the ground contacting surfaces of the first shoulder land portion "a", the first middle land portion "b", the crown land portion "c", the second middle land portion "d", and the second shoulder land portion "e", respectively, satisfied the following condition:

$$W1s=W2s>W1m=Wc=W2m \qquad (4)$$

Figure 21:
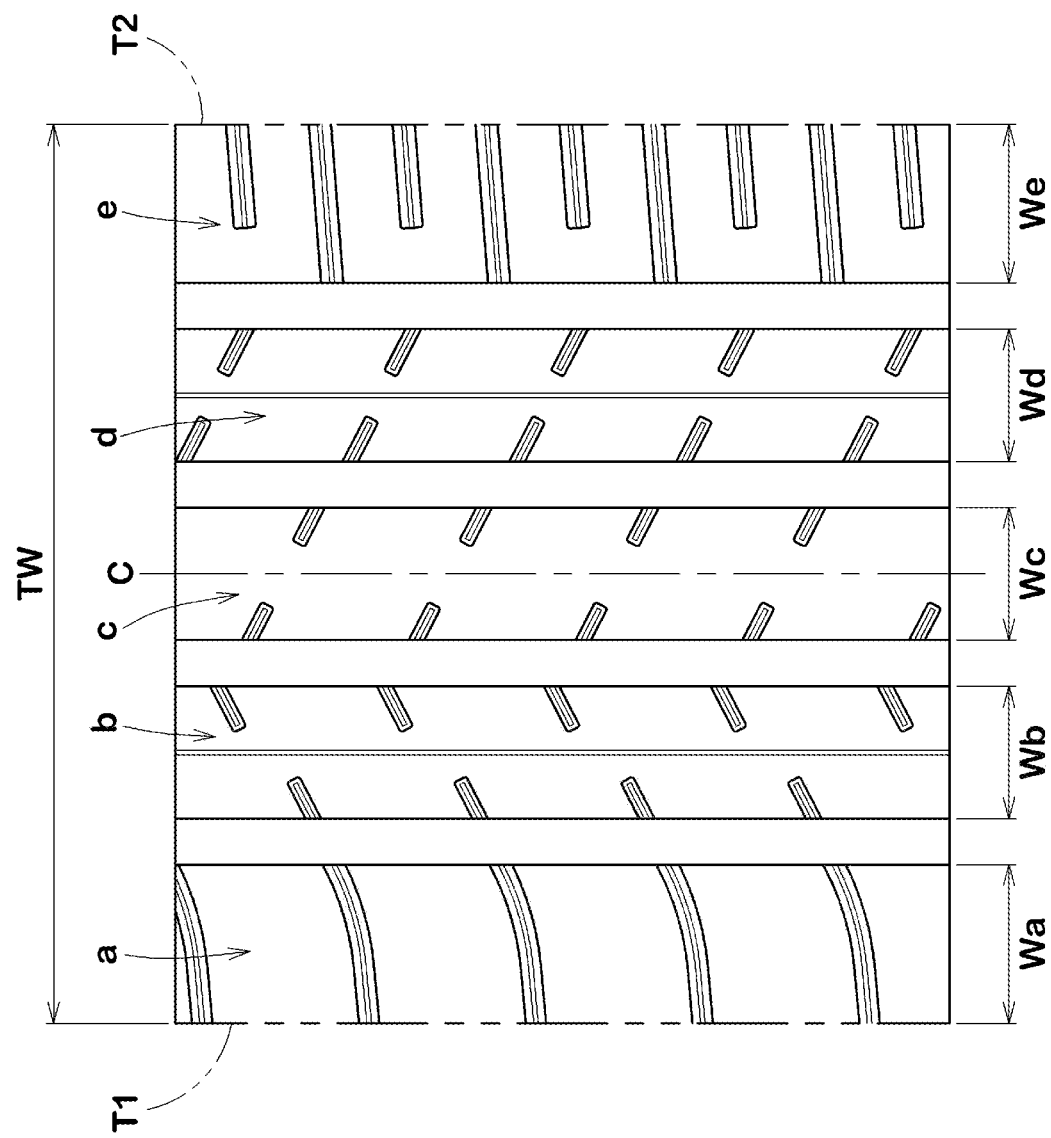
FIG. 21 is a developed partial view of the tread portion of the comparative example tire.

Further, as a comparative example (comp.), a tire having the tread pattern shown in FIG. 21 was manufactured.
In the comparative example, the sipes were provided with the widening portions in the same manner as shown in FIG. 1.
The widths of the land portions were the same as those of the reference tire. Otherwise, the comparative example was the same as that shown in FIG. 1.

The test tires were tested for the ride comfort and noise performance. The common specifications and test methods for each test tire are as follows.

wheel rim: 19×7.0 J tire pressure: 230 kPa test vehicle: 2000 cc 4WD car tire mounting position: all wheels <Ride Comfort Test>When the test car was running on a general road, the test driver evaluated the ride comfort. The results are indicated in Table 1 by an index based on the comparative example (comp.) being 100, wherein the larger the value, the better the ride comfort.

<Noise Performance Test>

When the test car was running at 40 to 100 km/h on a dry road surface, the noise heard in the test car was measured for the maximum sound pressure level. The results are shown in Table 1 wherein the decrease in sound pressure level from that of the reference tire is indicated by an index based on the comparative example being 100, wherein the larger the index number, the better the noise performance.

TABLE 1

| tire | comp. | Ex. 1 | Ex. 2 | Ex. 3 | Ex. 4 | Ex. 5 | Ex. 6 |
|---|---|---|---|---|---|---|---|
| tread pattern (Fig. No.) | 21 | 1 | 1 | 1 | 1 | 1 | 1 |
| W1s/Wc (%) | 119 | 119 | 115 | 117 | 122 | 125 | 119 |
| W1m/Wc(%) | 100 | 102 | 102 | 102 | 102 | 102 | 101 |
| W2m/Wc(%) | 100 | 95 | 95 | 95 | 95 | 95 | 95 |
| W2s/Wc (%) | 119 | 95 | 95 | 95 | 95 | 95 | 95 |
| first shoulder circum. groove width/TW(%) | 3.5 | 3.5 | 3.5 | 3.5 | 3.5 | 3.5 | 3.5 |
| ride comfort | 100 | 110 | 105 | 107 | 110 | 112 | 109 |
| noise | 100 | 116 | 118 | 116 | 113 | 110 | 117 |

| tire | Ex. 7 | Ex. 8 | Ex. 9 | Ex. 10 | Ex. 11 | Ex. 12 | Ex. 13 |
|---|---|---|---|---|---|---|---|
| tread pattern (Fig. No.) | 1 | 1 | 1 | 1 | 1 | 1 | 1 |
| W1s/Wc (%) | 119 | 119 | 119 | 119 | 119 | 119 | 119 |
| W1m/Wc(%) | 103 | 105 | 107 | 102 | 102 | 102 | 102 |
| W2m/Wc(%) | 95 | 95 | 95 | 90 | 93 | 97 | 99 |
| W2s/Wc (%) | 95 | 95 | 95 | 90 | 93 | 97 | 99 |
| first shoulder circum. groove width/TW(%) | 3.5 | 3.5 | 3.5 | 3.5 | 3.5 | 3.5 | 3.5 |
| ride comfort | 110 | 110 | 111 | 108 | 109 | 110 | 111 |
| noise | 116 | 114 | 110 | 116 | 116 | 114 | 112 |

| tire | Ex. 14 | Ex. 15 | Ex. 16 | Ex. 17 | Ex. 18 | Ex. 19 | Ex. 20 |
|---|---|---|---|---|---|---|---|
| tread pattern (Fig. No.) | 1 | 1 | 1 | 1 | 1 | 1 | 1 |
| W1s/Wc (%) | 119 | 119 | 119 | 119 | 115 | 117 | 122 |
| W1m/Wc(%) | 102 | 102 | 102 | 102 | 102 | 102 | 102 |
| W2m/Wc(%) | 93 | 97 | 99 | 95 | 95 | 95 | 95 |
| W2s/Wc (%) | 90 | 95 | 97 | 95 | 95 | 95 | 95 |
| first shoulder circum. groove width/TW(%) | 3.5 | 3.5 | 3.5 | 2.6 | 2.9 | 4.0 | 4.2 |

TABLE 1-continued

| | | | | | | | |
|---|---|---|---|---|---|---|---|
| ride comfort | 109 | 110 | 110 | 108 | 109 | 111 | 112 |
| noise | 116 | 116 | 113 | 118 | 117 | 115 | 114 |

From the test results, it was confirmed that the tires according to the present disclosure were improved in ride comfort and the noise performance.

Statement of the Present Disclosure

The present disclosure is as follows:—

Disclosure 1: A tire for which a mounting direction to a vehicle is specified, comprising: a tread portion having a first tread edge and a second tread edge to be positioned outboard and inboard, respectively, of the vehicle, wherein the tread portion is provided with four circumferential grooves extending continuously in the tire circumferential direction so as to axially divide the tread portion into five land portions, the five land portions are a first shoulder land portion including the first tread edge, a second shoulder land portion including the second tread edge, a first middle land portion adjacent to the first shoulder land portion, a second middle land portion adjacent to the second shoulder land portion, and a crown land portion between the first middle land portion and the second middle land potion, each of the five land portions is provided sipes, and under a 50% load state of the tire defined such that the tire mounted on a normal rim and inflated to a normal pressure is contacted with a flat horizontal plane at a camber angle of 0 degree and loaded with 50% of a normal tire load, axial widths $W1s$, $W1m$, $Wc$, $W2m$ and $W2s$ of ground contacting surfaces of the first shoulder land portion, the first middle land portion, the crown land portion, the second middle land portion, and the second shoulder land portion, respectively, satisfy the following condition:

$$W1s > W1m > Wc > W2m => W2s.$$

Disclosure 2: The tire according to Disclosure 1, wherein each of the five land portions is provided with only said sipes.

Disclosure 3: The tire according to Disclosure 1 or 2, wherein the first middle land portion has a first axial edge on the first tread edge side, and a second axial edge on the second tread edge side, and the sipes disposed in the first middle land portion include first middle sipes which include: an outer first middle sipe extending from the first axial edge and terminated to have a terminal end within the first middle land portion; and an inner first middle sipe extending from the second axial edge and terminated to have a terminal end within the first middle land portion.

Disclosure 4: The tire according to Disclosure 3, wherein the terminal end of the outer first middle sipe, and the terminal end of the inner first middle sipe are sifted from each other in the tire circumferential direction.

Disclosure 5: The tire according to Disclosure 3 or 4, wherein the outer first middle sipe extends linearly while inclining with respect to the tire axial direction, and has an axial length $La$, and the distance $Lb$ in the tire circumferential direction between the terminal end of the outer first middle sipe and the terminal end of the inner first middle sipe is within a range between $La \times 2 - 1$ and $La \times 2 + 1$ in millimeter.

Disclosure 6: The tire according to any one of Disclosures 1 to 5, wherein, under the 50% load state, an axial width of the ground contacting surface of the first shoulder land portion is in a range from 115% to 125% of the axial width of the ground contacting surface of the crown land portion.

Disclosure 7: The tire according to any one of Disclosures 1 to 6, wherein, under the 50% load state, an axial width of the ground contacting surface of the second shoulder land portion is in a range from 90% to 99% of an axial width of the ground contacting surface of the crown land portion.

Disclosure 8: The tire according to any one of Disclosures 1 to 7, wherein the first shoulder land portion is provided with a plurality of first shoulder sipes extending in a wavy shape in a tread surface, and the second shoulder land portion is provided with a plurality of second shoulder sipes extending in a wavy shape in the tread surface.

Disclosure 9: The tire according to Disclosure 8, wherein each of the first shoulder sipes and the second shoulder sipes extends in a wavy shape in the sipe depth direction.

Disclosure 10: The tire according to Disclosure 8 or 9, wherein the first middle land portion is provided with first middle sipes, the second middle land portion is provided with second middle sipes, and two side walls facing each other of, each of the first middle sipes and the second middle sipes are configured as flat surfaces.

Disclosure 11: The tire according to any one of Disclosures 1 to 10, wherein the first shoulder land portion is provided with a first sipe pair in which two wavy sipes are arranged side by side in the tire axial direction at a distance of 6 to 12 mm in the tire axial direction, and the second shoulder land portion is provided with a second sipe pair in which two wavy sipes are arranged side by side in the tire axial direction at a distance of 6 to 12 mm in the tire axial direction.

Disclosure 12: The tire according to any one of Disclosures 1 to 11, wherein the first shoulder land portion is provided with first shoulder sipes, the second shoulder land portion is provided with second shoulder sipes, and one pitch length of the second shoulder sipes is smaller than one pitch length of the first shoulder sipes.

Disclosure 13: The tire according to any one of Disclosures 1-12, wherein the second shoulder sipe includes: a traversing second shoulder sipe extending across the entire axial width of the second shoulder land portion; and a terminating second shoulder sipe extending axially from the second tread edge and terminated within the second shoulder land portion.

Disclosure 14: The tire according to any one of Disclosures 1 to 13, wherein the four circumferential grooves include a first shoulder circumferential groove positioned on the most first tread edge side among the four circumferential grooves, and the first shoulder circumferential groove has the smallest groove width among the four circumferential grooves.

Disclosure 15: The tire according to Disclosure 14, wherein the four circumferential grooves include a first crown circumferential groove positioned adjacently to the first shoulder circumferential groove, on the axially inner side thereof, and the first crown circumferential groove has the second smallest groove width among the four circumferential grooves.

Disclosure 16: The tire according to any one of Disclosures 1 to 15, wherein the first middle land portion has a first axial edge on the first tread edge side, a second axial edge on the second tread edge side, and a ground contacting surface between the first axial edge and the second axial edge, the first middle land portion is provided with first middle sipes, the first middle sipes include: an outer first middle sipe extending from the first axial edge and terminated to have a terminal end within the first middle land portion; and an inner first middle sipe extending from the second axial edge and terminated to have a terminal end within the first middle land portion, each of the outer first middle sipe and the inner first middle sipe comprises: a main portion extending in a tire radial direction; and a widening portion opened at the ground contacting surface and having a width larger than the main portion, and the widening portion has an inclined surface extending from the main portion to the ground contacting surface.

Disclosure 17: The tire according to Disclosure 16, wherein in the inclined surface of the outer first middle sipe, the width at the end on the first axial edge side is larger than the width at the end on the second axial edge side, and in the inclined surface of the inner first middle sipe, the width at the end on the second axial edge side is larger than the width at the end on the first axial edge side.

Disclosure 18: The tire according to Disclosure 16 or 17, wherein the width of the inclined surface of the outer first middle sipe at the end on the first axial edge side is smaller than the width of the inclined surface of the inner first middle sipe at the end on the second axial edge side.

Disclosure 19: The tire according to Disclosure 18, wherein the width of the inclined surface of the outer first middle sipe at the end on the first axial edge side is in a range from 40% to 60% of the width of the inclined surface of the inner first middle sipe at the end on the second axial edge side.

Disclosure 20: The tire according to any one of Disclosures 1 to 19, wherein the first shoulder land portion is provided with first shoulder sipes extending in the tire axial direction, and each of the first shoulder sipes comprises a main portion extending in the tire radial direction, and a widening portion having a width greater than the main portion and opened at the ground contacting surface of the first shoulder land portion, and the widening portion has an inclined surface which extends from the main portion to the ground contacting surface, and of which width in the top view of the first shoulder sipe increases inward in the tire axial direction.

DESCRIPTION OF THE REFERENCE SIGNS 2 tread portion
3 circumferential groove
4 land portion
11 first shoulder land portion
12 first middle land portion
13 crown land portion
14 second middle land portion
15 second shoulder land portion
16 sipe
T1 first tread edge
T2 second tread edge

The invention claimed is:

1. A tire for which a mounting direction to a vehicle is specified, comprising: a tread portion having a first tread edge and a second tread edge to be positioned outboard and inboard, respectively, of the vehicle, wherein the tread portion is provided with four circumferential grooves extending continuously in the tire circumferential direction so as to axially divide the tread portion into five land portions, the five land portions are a first shoulder land portion including the first tread edge, a second shoulder land portion including the second tread edge, a first middle land portion adjacent to the first shoulder land portion, a second middle land portion adjacent to the second shoulder land portion, and a crown land portion between the first middle land portion and the second middle land potion, each of the five land portions is provided with sipes, under a 50% load state of the tire defined such that the tire mounted on a normal rim and inflated to a normal pressure is contacted with a flat horizontal plane at a camber angle of 0 degree and loaded with 50% of a normal tire load, axial widths W1$s$, W1$m$, Wc, W2$m$ and W2$s$ of ground contacting surfaces of the first shoulder land portion, the first middle land portion, the crown land portion, the second middle land portion, and the second shoulder land portion, respectively, satisfy the following condition:

$$W1s > W1m > Wc > W2m => W2s,$$

the first middle land portion has a first axial edge on the first tread edge side, a second axial edge on the second tread edge side, and the ground contacting surface between the first axial edge and the second axial edge, the sipes provided in the first middle land portion are first middle sipes, the first middle sipes include:
an outer first middle sipe extending from the first axial edge and terminated to have a terminal end within the first middle land portion; and
an inner first middle sipe extending from the second axial edge and terminated to have a terminal end within the first middle land portion, each of the outer first middle sipe and the inner first middle sipe comprises:
a main portion extending in a tire radial direction; and
a widening portion opened at the ground contacting surface and having a width larger than the main portion, the widening portion has an inclined surface extending from the main portion to the ground contacting surface, and the width of the inclined surface of the outer first middle sipe at the end on the first axial edge side is smaller than the width of the inclined surface of the inner first middle sipe at the end on the second axial edge side.

2. The tire according to claim 1, wherein the first shoulder land portion is provided with a plurality of first shoulder sipes extending in a wavy shape in a tread surface, and
the second shoulder land portion is provided with a plurality of second shoulder sipes extending in a wavy shape in the tread surface.

3. The tire according to claim 1, wherein the four circumferential grooves include a first shoulder circumferential groove positioned on the most first tread edge side among the four circumferential grooves, and the first shoulder circumferential groove has the smallest groove width among the four circumferential grooves.

4. The tire according to claim 3, wherein the four circumferential grooves include a first crown circumferential groove positioned adjacently to the first shoulder circumferential groove, on the axially inner side thereof, and the first crown circumferential groove has the second smallest groove width among the four circumferential grooves.

5. The tire according to claim 1, wherein in the inclined surface of the outer first middle sipe, the width at the end on the first axial edge side is larger than the width at the end on the second axial edge side, and in the inclined surface of the inner first middle sipe, the width at the end on the second axial edge side is larger than the width at the end on the first axial edge side.

6. The tire according to claim 1, wherein the width of the inclined surface of the outer first middle sipe at the end on the first axial edge side is in a range from 40% to 60% of the width of the inclined surface of the inner first middle sipe at the end on the second axial edge side.

7. The tire according to claim 1, wherein the first shoulder land portion is provided with first shoulder sipes extending in the tire axial direction, and each of the first shoulder sipes comprises a main portion extending in the tire radial direction, and a widening portion having a width greater than the main portion and opened at the ground contacting surface of the first shoulder land portion, and the widening portion has an inclined surface which extends from the main portion to the ground contacting surface, and of which width in the top view of the first shoulder sipe increases inward in the tire axial direction.

8. A tire for which a mounting direction to a vehicle is specified, comprising: a tread portion having a first tread edge and a second tread edge to be positioned outboard and inboard, respectively, of the vehicle, wherein the tread portion is provided with four circumferential grooves extending continuously in the tire circumferential direction so as to axially divide the tread portion into five land portions, the five land portions are a first shoulder land portion including the first tread edge, a second shoulder land portion including the second tread edge, a first middle land portion adjacent to the first shoulder land portion, a second middle land portion adjacent to the second shoulder land portion, and a crown land portion between the first middle land portion and the second middle land potion, each of the five land portions is provided with sipes, under a 50% load state of the tire defined such that the tire mounted on a normal rim and inflated to a normal pressure is contacted with a flat horizontal plane at a camber angle of 0 degree and loaded with 50% of a normal tire load, axial widths $W1s$, $W1m$, $Wc$, $W2m$ and $W2s$ of ground contacting surfaces of the first shoulder land portion, the first middle land portion, the crown land portion, the second middle land portion, and the second shoulder land portion, respectively, satisfy the following condition:

$$W1s > W1m > Wc > W2m => W2s,$$

the first shoulder land portion is provided with only a plurality of pairs of two wavy sipes arranged side by side in the tire axial direction along a straight line at a distance of 6 to 12 mm in the tire axial direction, and the second shoulder land portion is provided with only a plurality of pairs of two wavy sipes arranged side by side in the tire axial direction along a straight line at a distance of 6 to 12 mm in the tire axial direction.

9. The tire according to claim 8, wherein each of the five land portions is provided with only said sipes.

10. The tire according to claim 8, wherein the first middle land portion has a first axial edge on the first tread edge side, and a second axial edge on the second tread edge side, and the sipes disposed in the first middle land portion include first middle sipes which include: an outer first middle sipe extending from the first axial edge and terminated to have a terminal end within the first middle land portion; and an inner first middle sipe extending from the second axial edge and terminated to have a terminal end within the first middle land portion.

11. The tire according to claim 10, wherein the terminal end of the outer first middle sipe, and the terminal end of the inner first middle sipe are shifted from each other in the tire circumferential direction.

12. The tire according to claim 10, wherein the outer first middle sipe extends linearly while inclining with respect to the tire axial direction, and has an axial length La, and the distance Lb in the tire circumferential direction between the terminal end of the outer first middle sipe and the terminal end of the inner first middle sipe is within a range between La×2−1 and La×2+1 in millimeter.

13. The tire according to claim 8, wherein, under the 50% load state, an axial width of the ground contacting surface of the first shoulder land portion is in a range from 115% to 125% of the axial width of the ground contacting surface of the crown land portion.

14. The tire according to claim 8, wherein, under the 50% load state, an axial width of the ground contacting surface of the second shoulder land portion is in a range from 90% to 99% of an axial width of the ground contacting surface of the crown land portion.

* * * * *